(12) United States Patent
Azukizawa

(10) Patent No.: US 8,942,494 B2
(45) Date of Patent: Jan. 27, 2015

(54) IMAGE PROCESSING APPARATUS AND METHOD

(71) Applicant: Fujitsu Semiconductor Limited, Yokohama-shi (JP)

(72) Inventor: Yoichi Azukizawa, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 176 days.

(21) Appl. No.: 13/671,000

(22) Filed: Nov. 7, 2012

(65) Prior Publication Data

US 2013/0121602 A1    May 16, 2013

(30) Foreign Application Priority Data

Nov. 15, 2011    (JP) ................................. 2011-250026

(51) Int. Cl.
*G06K 9/36*    (2006.01)
*G06T 9/00*    (2006.01)

(52) U.S. Cl.
CPC ..................................... *G06T 9/001* (2013.01)
USPC ....................................................... 382/233

(58) Field of Classification Search
CPC . H04N 21/816; H04N 13/0029; H04N 19/00; H04N 13/0018; H04N 2013/0081; G06T 2207/10012; G06T 2207/10021
See application file for complete search history.

(56) References Cited

U.S. PATENT DOCUMENTS

| 5,612,735 | A  | * | 3/1997  | Haskell et al. ................... 348/43 |
|---|---|---|---|---|
| 2007/0064799 | A1 | * | 3/2007 | Ha ........................... 375/240.12 |
| 2007/0104276 | A1 | * | 5/2007 | Ha ........................... 375/240.16 |
| 2008/0198924 | A1 | * | 8/2008 | Ho et al. ................... 375/240.01 |
| 2008/0240549 | A1 | * | 10/2008 | Koo et al. ....................... 382/154 |
| 2008/0252497 | A1 | * | 10/2008 | Widmer ......................... 341/95 |
| 2008/0285654 | A1 | * | 11/2008 | Cai et al. ................... 375/240.16 |
| 2011/0141232 | A1 | * | 6/2011 | Tsukagoshi ..................... 348/43 |
| 2012/0014590 | A1 | * | 1/2012 | Martinez-Bauza et al. .. 382/154 |
| 2013/0229485 | A1 | * | 9/2013 | Rusanovskyy et al. ......... 348/43 |

FOREIGN PATENT DOCUMENTS

JP    2003-319419    11/2003

* cited by examiner

*Primary Examiner* — Jingge Wu
(74) *Attorney, Agent, or Firm* — Fujitsu Patent Center

(57) ABSTRACT

An image processing apparatus including a decoding unit configured to decode encoded stereoscopic dynamic image data containing a consecutive picture pair having a disparity, for each block into which the picture has been divided, and to detect a decoding error, an estimation unit configured to perform first estimation processing of estimating, as a disparity of an error block between an error picture including an error block in which the decoding error has been detected and a paired picture thereof, a disparity of a corresponding-location corresponding to the error block between an approximate picture and a paired picture thereof, and a correction unit configured to correct the decoding error by applying, to the error block, a block located at a position shifted by an amount of the estimated disparity from the corresponding-location in the paired picture of the error picture.

14 Claims, 16 Drawing Sheets

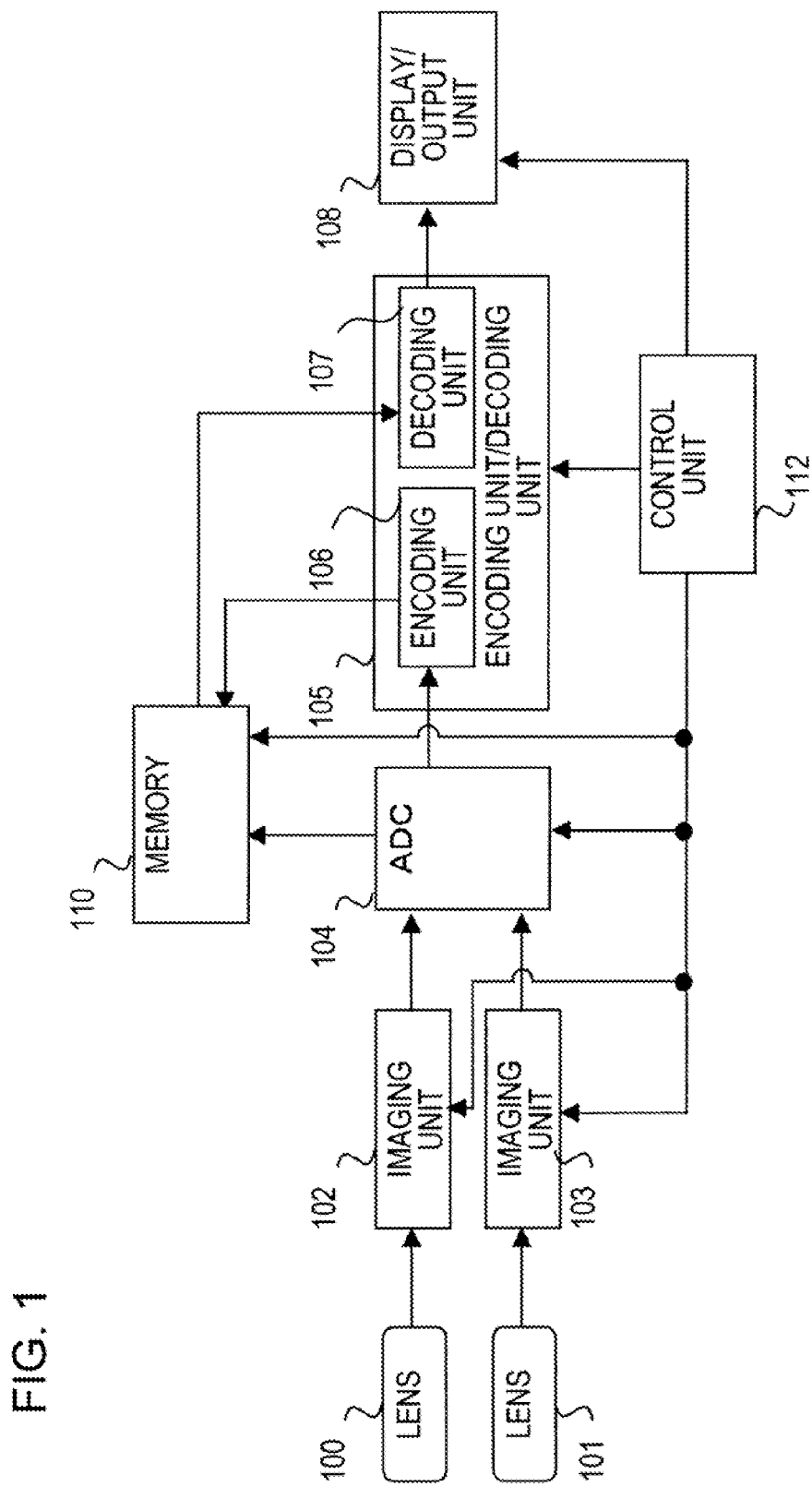

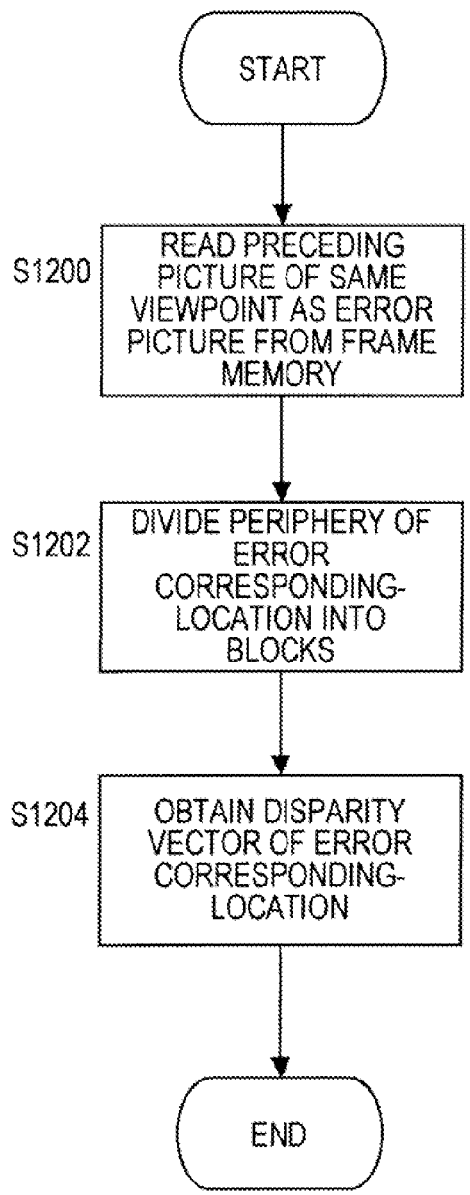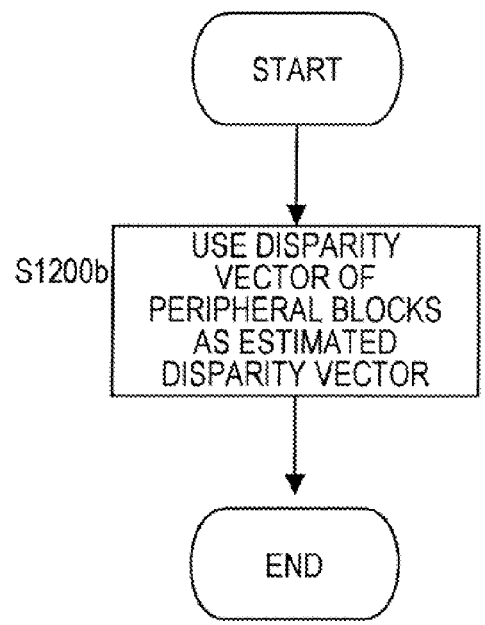
FIG. 12A
FIG. 12B

IMAGE PROCESSING APPARATUS AND METHOD

CROSS-REFERENCE TO RELATED APPLICATION

This application is based upon and claims the benefit of priority of the prior Japanese Patent Application No. 2011-250026, filed on Nov. 15, 2011, the entire contents of which are incorporated herein by reference.

FIELD

The embodiments discussed herein relate to an image processing apparatus and an image processing method for decoding encoded stereoscopic dynamic image data.

BACKGROUND

Stereoscopic dynamic image data which enables a viewer to perceive moving images stereoscopically includes a pair of consecutive still images (pictures) respectively corresponding to the viewpoints of the left and right eyes. A simultaneous picture pair has a disparity corresponding to the left and right viewpoints. The amount of data of such stereoscopic dynamic image data is generally vast. Thus, for example, with an imaging apparatus which captures a stereoscopic dynamic image and once stores the data thereof in an internal limited storage medium, proposed is an encoding method for compressing the stereoscopic dynamic image data.

The H.264/MPEG4-AVC (Advanced Video Coding) (hereinafter simply referred to as the "H.264") standard compliant with MVC (Multi-view Video Coding) that was developed by the International Organization for Standardization/International Electrotechnical Commission (ISO/IEC) is an encoding method of compressing redundant data based on the high correlation between blocks which are approximate spatially or temporally or between blocks in a simultaneous picture pair upon dividing a picture into blocks of small areas and encoding data for each block. With the H.264 standard, an encoding target block is predicted via interpolation processing, motion vectors or the like from a simultaneous paired picture or a another temporally approximate picture in the same picture as the encoding target block, and residual data corresponding to the difference between the block that was predicted (hereinafter referred to as the "predicted block") and the encoding target block, and prediction information data indicating the information to be used in the prediction are obtained and encoded in accordance with a prescribed syntax element.

Consequently, for example, the encoded stereoscopic dynamic image data is read for each block from the storage medium for image processing or display output in an imaging apparatus, and decoded for block. In the decoding process, the predicted block based on the prediction information data is corrected with residual data, and the original block is thereby decoded.

Meanwhile, when the stereoscopic dynamic image data is read from the storage medium, for instance, due to the deterioration of the storage element or influence of the ambient temperature, there are cases where the residual data or the prediction information data is lost as a result of the data stored in the storage medium being destroyed or subjected to so-called data corruption, and a decoding error arises. Consequently, the original block is not decoded. Thus, in order to deal with the foregoing problem, proposed is a method of correcting a decoding error (for example, Japanese Patent Application Publication No. 2003-319419). In one example, a block extracted from another picture is applied to the location of the decoding error of the picture in which a decoding error was detected so as to correct the decoding error. Note that, in the ensuing explanation, a picture in which a decoding error was detected is referred to as an error picture, and a block in which a decoding error was detected is referred to as an error block.

In the foregoing method, for example, when a block corresponding to an error block is extracted from a preceding picture having the same viewpoint as the error picture and applied to the error block, there are cases where favorable correction accuracy is not obtained due to the difference according to the movement between the extracted block and the error block. Thus, for example, proposed is a method of extracting a block corresponding to the error block contained in the error picture and the simultaneous paired picture and applying such block to the error block. In the foregoing case, since (substantially) the same blocks are included in the picture pair, it is possible to improve the correction accuracy. However, since the block to be extracted is located at a position shifted by an amount of disparity from the position corresponding to the error block in the paired picture, additionally proposed is a method of estimating the disparity of the error block in order to obtain the foregoing disparity.

SUMMARY

In the foregoing method, a highly accurate estimation of the disparity of the error block is demanded in order to extract the block corresponding to the error block from the paired picture.

In accordance with an embodiment, an image processing apparatus, including: a decoding unit configured to decode encoded stereoscopic dynamic image data containing a consecutive picture pair having a disparity, for each block into which the picture has been divided, and to detect a decoding error; an estimation unit configured to perform first estimation processing of estimating, as a disparity of an error block between an error picture including the error block in which the decoding error has been detected and a paired picture thereof, a disparity of a corresponding-location corresponding to the error block between an approximate picture and a paired picture thereof, the approximate picture being decoded before the error picture and having blocks that are peripheral to the corresponding-location and are approximate to blocks peripheral to the error block in the error picture; and a correction unit configured to correct the decoding error by applying, to the error block, a block located at a position shifted by an amount of the estimated disparity from the corresponding-location in the paired picture of the error picture.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram explaining an example of applying the image processing apparatus of this embodiment.

FIGS. 12A and 12B are flowcharts illustrating the process example thereof, and correspond to the subroutine of step S609.

DESCRIPTION OF EMBODIMENTS

Figure 2A:
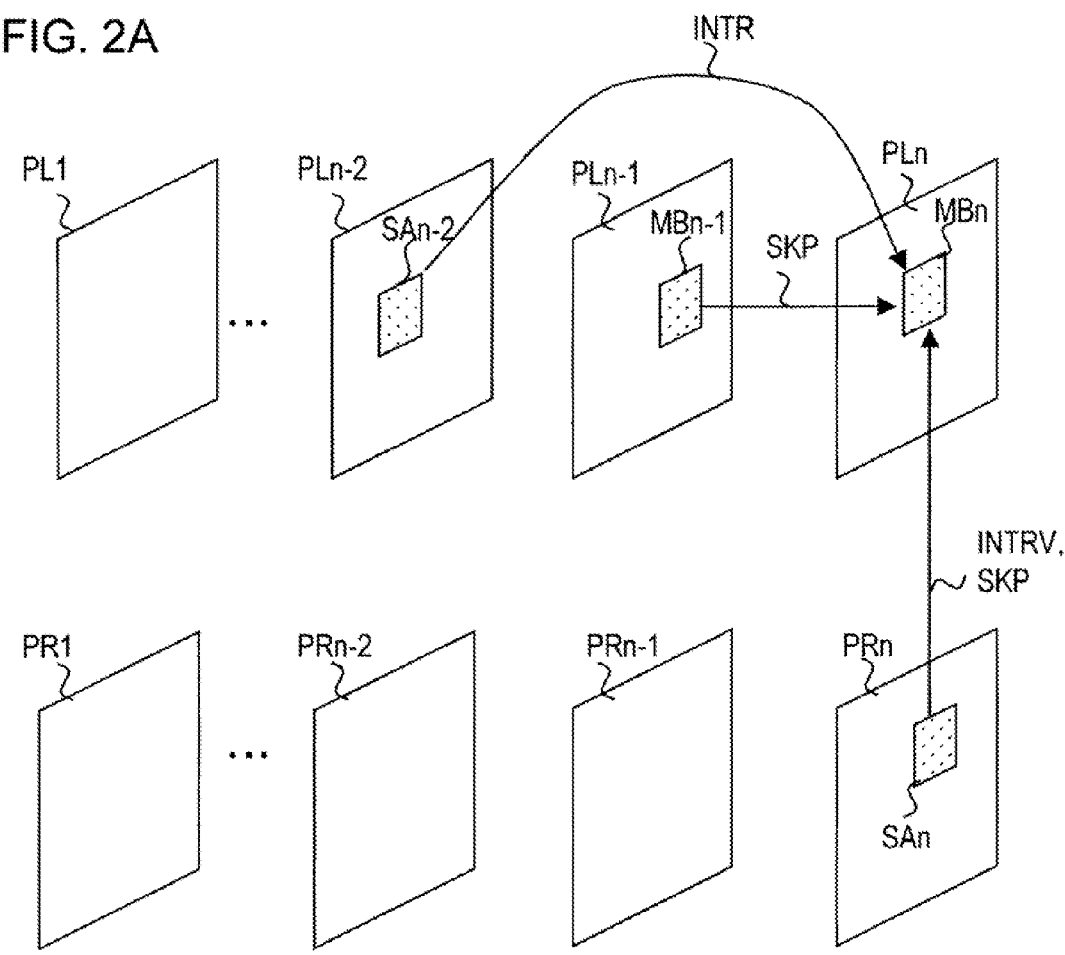
FIGS. 2A and 2B illustrate the encoding and decoding of the stereoscopic dynamic image data by the encoding/decoding unit.

Embodiments will be described hereinafter according to the drawings. However, it is noted that the technical scope is not limited to the embodiments described below, but covers the matters described in the claims and the equivalents thereof.

FIG. 1 is a diagram explaining an example of applying the image processing apparatus of this embodiment. FIG. 1 illustrates the configuration of an imaging apparatus for capturing a stereoscopic dynamic image. The imaging apparatus includes lenses 100, 101, imaging units 102, 103, an AD converter 104, an encoding/decoding unit 105, a display/output unit 108, a memory 110, and a control unit 112.

The lenses 100, 101 respectively corresponding to, for instance, the viewpoints of the right eye and the left eye. The lenses 100, 101 focus subject light from a subject in the respective viewpoints on a light-receiving surface of the imaging units 102, 103. The imaging units 102, 103 respectively convert the subject light into image signals based on photoelectric conversion by using imaging elements arrayed two-dimensionally on the light-receiving surface. The imaging units 102, 103 respectively include, for example, a CCD (Charge Coupled Device) sensor, or a CMOS (Complementally Metal Oxide Semiconductor) sensor. The imaging units 102, 103 simultaneously perform imaging for each frame. The frequency of imaging is, for example, 30 frames per second. In addition, the imaging units 102, 103 sequentially output the image signals per frame in raster-scan order.

The AD converter 104 sequentially converts the image signal sequence output from the imaging units 102, 103 into digital signals. Subsequently, the pixel data that was converted into digital signals is incorporated into the encoding/decoding unit 105 as stereoscopic dynamic image data. Here, one frame worth of pixel data corresponds to one still image (picture). One picture includes, for example, several ten thousand to several hundred thousand pixels arrayed two-dimensionally. The stereoscopic dynamic image data includes a pair of consecutive pictures respectively corresponding to the viewpoints of the left and right eyes. Each picture pair included a disparity corresponding to the distance between the viewpoints as a result of being obtained by imaging subjects respectively from different viewpoints simultaneously.

The encoding/decoding unit 105 includes an encoding unit 106 for encoding the stereoscopic dynamic image data including a consecutive picture pair, and a decoding unit 107 for decoding the encoded stereoscopic dynamic image data. The encoding/decoding unit 105 is, for example, an LSI (Large Scale Integration) for encoding and decoding the stereoscopic dynamic image data. The encoding unit 106 performs encoding, for example, based on the MVC-compliant H.264 standard. In addition, the encoding unit 106 stores the encoded stereoscopic dynamic image data in the memory 110. The memory 110 is, for example, an SDRAM (Synchronous Dynamic RAM). Moreover, the decoding unit 107 reads the encoded stereoscopic dynamic image data from the memory 110 and decodes the encoded stereoscopic dynamic image data. The decoding unit 107 is an example of the image processing apparatus in this embodiment. The decoding unit 107 outputs the decoded stereoscopic dynamic image data to the display/output unit 108. Note that the encoding/decoding unit 105 may additionally comprise an image processing unit which performs various types of processing on the decoded picture such as correction processing of color or brightness, noise elimination processing, contour enhancement processing, and the like.

The display/output unit 108 consecutively displays the picture pair included in the stereoscopic dynamic image data on a display monitor not illustrated. A barrier or a lens for dividing the picture pair into left and right viewpoints is provided to the display surface of the display monitor. A viewer viewing the consecutive picture pair via the foregoing components will perceive a stereoscopic dynamic image based on the disparity of the picture pair. Otherwise, the display/output unit 108 outputs the picture pair to external devices such as a storage device or a picture display device via an interface such as an HDMI (High-Definition Multimedia Interface) terminal or a component terminal.

The control unit 112 outputs control signals to the imaging units 102, 103, the AD converter 104, the encoding/decoding unit 105, the display/output unit 108, and the memory 110 for controlling the operation of the respective units. The control unit 112 thereby comprehensively controls the operation of the imaging apparatus. The control unit 112 is, for example, a CPU (Central Processing Unit).

Figure 2B:
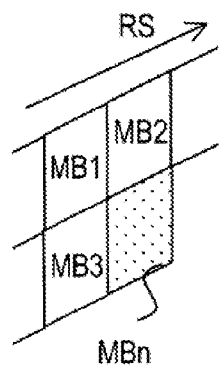

The encoding and decoding of the stereoscopic dynamic image data by the encoding/decoding unit 105 are now explained with reference to FIG. 2A and FIG. 2B. FIG. 2A schematically illustrates left eye pictures PLi (i=1, . . . , n−2, n−1, n) and right eye pictures PRi. Here, the suffix "i" indicates the imaging order. The picture pair PLi, PRi having the same suffix were imaged simultaneously, and have a disparity.

[Encoding]

Encoding is foremost explained. The encoding unit 106 encodes, for each picture pair, a right eye base view picture and a left eye non-base view picture, in that order. Thus, for example, pictures PR1, PL1, . . . , PRn−2, PLn−2, PRn−1, PLn−1, PRn, PLn are encoded in that order.

Encoding of the respective pictures is performed by dividing the picture into blocks of a small area for each block. A block is, for example, a macro block including 16×16 pixels, or a variable block in which the macro block was further divided (for example, unit in which the macro block of 16×16 pixels is divided into 16×8 pixels, 8×16 pixels, 8×8 pixels, 8×4 pixels, 4×8 pixels, or 4×4 pixels). For example, upon encoding the picture PLn, the encoding unit 106 divides the pixels of the picture PLn into a plurality of blocks, and performs encoding according to the MVC-compliant H.264 standard for each block along the raster-scan direction.

For example, upon encoding the block MBn, the encoding unit 106 detects a block that coincides with or is approximate to the block MBn from, the simultaneous paired picture PRn as the block MBn, another picture that is temporally adjacent, or the same picture PLn, refers to the detected block (the block to be referred to is hereinafter referred to as the "reference block"), and thereby predicts the encoding target block MBn. In addition, the encoding unit 106 obtains the residual data of the predicted block that was predicted and the actual encoding target block MBn, and encodes the obtained residual data and the prediction information data indicating the information that was used in the prediction. The residual data is encoded via CAVLC (Context-based Adaptive Variable Length Coding) or CABAC (Context-based Adaptive Binary Arithmetic Coding) after DCT conversion (discrete cosine transform) and quantization are performed. Moreover, the prediction information data is encoded by using exponential Golomb coding.

As the prediction methods using the reference blocks, there are inter prediction that is performed by referring to the blocks in another picture, and intra prediction that is performed by conducting the prediction within the same picture PLn. Moreover, there is also the processing referred to as "skip" which uses the reference blocks as is. With skip, in many cases, the reference blocks of the preceding picture of the same viewpoint or the simultaneous paired picture are used as is.

Encoding based on inter prediction also includes a case of predicting the encoding target block MBn from the reference block SAn in the picture PLn and the simultaneous paired picture PRn as illustrated schematically with the arrow INTRV in FIG. 2A, and a case of predicting the encoding target block MBn from the reference blocks in the picture (for instance, the second preceding picture PLn−2) of the same viewpoint which is adjacent in the time direction as schematically illustrated with the arrow INTR in FIG. 2A. In the ensuing explanation, the case of using the reference blocks in the paired picture is specifically referred to as the encoding based on inter-view prediction (hereinafter referred to as the "inter-view encoding"), and the case of using the reference blocks in the picture adjacent in the time direction is specifically referred to as the encoding based on inter prediction (hereinafter referred to as the "inter encoding") for differentiation.

In the case of inter-view encoding, the encoding unit 106 detects the reference block SAn which (substantially) coincides with the encoding target block MBn of the picture PLn from the paired picture PRn. The reference block SAn is detected via matching with each variable block. In the matching process, the difference for each pixel in the block; for example, the sum of the absolute value errors is calculated, and the compared block is determined as coinciding in the case that the foregoing value becomes minimum. In addition, the encoding unit 106 calculates and encodes, with the reference block SAn as the predicted block, the residual data in relation to the encoding target block MBn and the disparity vector as the prediction information data. The disparity vector is the motion vector indicating the travel direction and travel distance from the reference block SAn to the encoding target block MBn.

Meanwhile, in the case of inter encoding, the encoding unit 106 detects, among the plurality of pictures that are consecutive in the time direction, the reference block SAn−2 which coincides with or is the most approximate to the encoding target block MBn (for instance, in which the sum of the absolute value error in the matching becomes minimum), for example, based on matching with each variable block. Here, the number of pictures to be searched can be set arbitrarily within the range of the H.264 standard (for example, three pictures encoded in the past and the respective paired pictures thereof). However, in the H.264 standard, it is also possible to detect the reference block from an encoded picture even if the imaging order of that picture is later. In addition, the encoding unit 106 calculates and encodes, with the reference block SAn−2 as the predicted block, the residual data in relation to the encoding target block MBn and the motion vector as the prediction information data. The motion vector is a vector indicating the travel direction and travel distance from the reference block SAn−2 to the encoding target block MBn.

Moreover, in skip, the encoding unit 106 directly applies, to the encoding target block MBn as schematically indicated with the arrow SKP, the reference block MBn−1 in the preceding picture PLn−1 of the same viewpoint or the reference block SAn in the simultaneous paired picture PRn indicated with the motion vector obtained based on median (intermediate value) prediction. Here, a short bit number is assigned to the block MBn with Golomb coding which indicates the application of a block based on skip.

In addition, with encoding based on intra prediction (hereinafter referred to as the "intra encoding"), the encoding unit 106 performs extrapolative prediction to the block MBn based on the pixels in the blocks adjacent to the encoding target block MBn in the picture PLn, and encodes the residual data of the predicted block and the encoding target block MBn, and the prediction information data having the interpolating direction and the like. The pixels used for the extrapolative prediction are, for instance, as illustrated in FIG. 2B, pixels that are adjacent to the encoding target block MBn in a line along the raster-scan direction RS and are included in the block MB2 positioned on the block MBn in a preceding line, the block MB1 that is adjacent thereto and is to be encoded first, and the block MB3 that is adjacent to the block MBn in the same line as the block MBn and is to be encoded first.

Note that, in the H.264 standard, in accordance with the referral relationship between the blocks, prescribed are an I picture in which encoding is performed by referring to blocks in the same picture, a P picture in which encoding is performed by referring to the blocks in a temporally preceding picture, and a B picture in which encoding is performed by referring to the blocks in a picture that is temporally further preceding and the blocks in a picture that is temporarily subsequent. In addition, with the H.264 standard, unlike the preceding standard of MPEG-2 which prohibits the referral of blocks of another picture across the I picture, referral across the I picture is enabled. Moreover, in one picture pair, the blocks in the base view picture to be encoded first can be referred to by the non-base picture to be encoded subsequently. Moreover, there are also cases where encoding is performed in the direct mode of only the B picture. In the direct mode, the residual data of the predicted block and the encoding target block MBn is calculated by selecting temporal prediction or spatial prediction without encoding the motion vector or the reference index.

The encoding unit 106 selects one among the foregoing inter-view encoding, inter encoding, skip, or intra encoding according to the evaluation value for each case that each time of encoding is performed. The evaluation value is an evaluation value in a trade-off relation between the sum of squared difference of the difference between the reference block and the encoding target block MBn and the quantity of code that is estimated when the respective encoding processes are executed. In other words, the smaller the evaluation value, the higher the encoding efficiency, and the greater the evaluation value, the lower the encoding efficiency. The encoding unit 106 obtains the evaluation value of the respective encoding methods for each encoding target block MBn and, for instance, selects the encoding method in which the evaluation value becomes smallest; that is, the encoding method with the most favorable encoding efficiency such that the difference between the encoding target block MBn and the reference block is small as possible, and the amount of data during the encoding process is as small as possible. Note that the encoding method may differ for each block. Moreover, encoding is performed in compliance with the syntax element of h.264.

For example, when the correlation between pictures in the time direction is low and consequently the difference between the pictures adjacent in the time direction is great such as in scenes with much movement, the inter-view encoding or skip which uses the reference blocks in the simultaneous paired picture and not another picture in the time direction, or intra encoding which uses extrapolative prediction in the same picture is selected. Contrarily, when the correlation between pictures in the time direction is high and consequently the difference between the pictures adjacent in the time direction is small such as in scenes with minimal movement, inter encoding or skip which uses the reference blocks in another picture in the time direction is selected.

[Decoding Process]

The decoding process is now explained. The decoding unit 107 performs decoding for each block (for example, macro block or variable block) along the raster-scan direction. For example, upon decoding the decoding target block MBn of the picture PLn, the decoding unit 107 acquires information for decoding the decoding target block MBn from the syntax element. This information includes information related to the encoding method of the respective blocks contained in that slice (that is, inter-view encoding, inter encoding, skip, or intra encoding), and the reference blocks. In addition, the decoding unit 107 decodes the encoded residual data and the prediction information data of the decoding target block MBn. In the decoding process, based on a process that is opposite to the encoding process, inverse quantization and inverse DCT transform are performed.

In addition, the decoding unit 107 refers to the reference block that was decoded first according to the adopted encoding method, and decodes the block MBn by using the decoded residual data and the prediction information data. For example, when inter-view encoding is adopted, the predicted block that is predicted by the disparity vector from the reference blocks is corrected using residual data, and the block MBn is thereby decoded. Moreover, when inter encoding is adopted, the predicted block that is predicted by the motion vector from the reference blocks is corrected using residual data, and the block MBn is decoded thereby. In addition, when skip is adopted, the reference blocks are applied directly to decode the block MBn. In addition, when intra encoding is adopted, the predicted block that is predicted based on the extrapolative prediction of the pixels adjacent to the decoding target block MBn is corrected using residual data, and the block MBn is thereby decoded.

Here, for example, upon reading the encoded stereoscopic dynamic image data from the memory 110 and decoding the encoded stereoscopic dynamic image data, due to the deterioration of the storage element or influence of the ambient temperature, there are cases where the residual data or the prediction information data is lost as a result of the data stored in the memory 110 being destroyed or subjected to so-called data corruption, and a decoding error arises. For example, when the prediction information data is lost, the interpolating direction, motion vector, the disparity vector and the like become unknown. Consequently, the original block is not decoded, and this will interfere with the decoding of the stereoscopic dynamic image data. Thus, the decoding unit 107 corrects the decoding error as indicated below.

Figure 3:
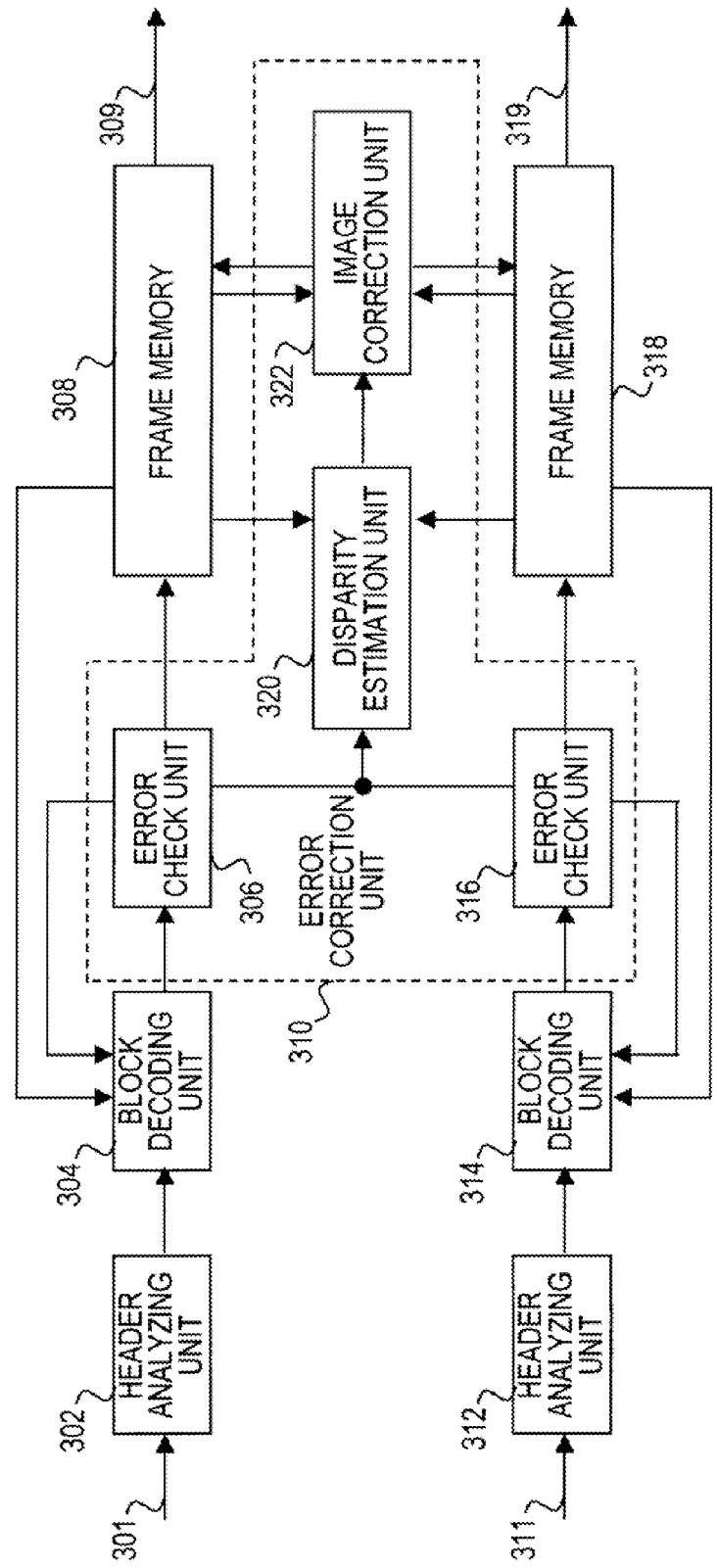
FIG. 3 illustrates a detailed configuration example of the decoding unit.

FIG. 3 illustrates a detailed configuration example of the decoding unit 107. The decoding unit 107 includes header analyzing units 302, 312, block decoding units 304, 314, frame memories 308, 318, and an error correction unit 310. The error correction unit 310 additionally includes error check units 306, 316, a disparity estimation unit 320, and an image correction unit 322. The header analyzing unit 302, the block decoding unit 304, the frame memory 308, and the error check unit 306 correspond to, for example, processing of consecutive pictures for the right eye. Meanwhile, the header analyzing unit 312, the block decoding unit 314, the frame memory 318, and the error check unit 316 correspond to processing of consecutive pictures for the left eye. The foregoing left and right processing systems are operated based on the control of a control unit not illustrated in this diagram.

Foremost, encoded data 301, 311 of sequential picture pairs read from the memory 110 are input to the decoding unit 107. The encoded data 301 of the right eye picture is input to the header analyzing unit 302, and the encoded data 311 of the left eye picture is input to the header analyzing unit 312.

The header analyzing units 302, 312 respectively analyze the NAL (Network Abstraction Layer) unit in compliance with the syntax element of h.264. For example, the header analyzing units 302, 312 analyze the SPS (Sequence Parameter Set), PPS (Picture Parameter Set), subset PPS, SEI (Supplemental Enhancement Information), or analyze the slice header. The slice header contains information for decoding the respective slices; for example, POC (Picture Order Count) indicating the display order and the rearrangement information of the reference block list. The header analyzing units 302, 312 acquire, from the respective slice headers, the information for decoding the respective slices, and transfer the information together with the slice data to the block decoding units 304, 314.

The block decoding units 304, 314 acquire reference target information regarding the block to be decoded (for example, macro block) from ref_idx_10 or ref_idex_11 of macroblock_layer, and read the decoded picture containing the reference blocks from the frame memories 308, 318, respectively. In addition, the block decoding units 304, 314 decode the respective blocks according to the corresponding encoding method. Moreover, the block decoding units 304, 314 respectively transfer the decoded blocks to the error check units 306, 316. Here, when the block decoding units 304, 314 detect a decoding error, the block decoding units 304, 314 transfer information (for instance, macro block number) indicating the block in which the decoding error occurred to the error check units 306, 316, respectively. A decoding error is detected, for example, in cases where reference target information does not exist when inter-view encoding, inter encoding, or intra encoding is adopted, cases where the size of the motion vector or disparity vector exceeds the prescribed maximum value, cases where the coefficient value upon subjecting the encoded data to inverse quantization exceeds the prescribed maximum value, cases where the coefficient value upon performing inverse DCT transform exceeds the prescribed maximum value, or when the number of decoded macro blocks falls short of the prescribed number of blocks.

When normally decoded blocks are respectively sent from the block decoding units 304, 314, the error check units 306, 316 sequentially store the decoded blocks in the frame memories 308, 318. Consequently, the decoded picture containing the decoded blocks is stored in the frame memories 308, 318. Meanwhile, when the block number (macro block number) in which the decoding error occurred was respectively sent from the block decoding units 304, 314, the error check units 306, 316 record the block number in which the error of the respective pictures was detected, for instance, in an internal register. In addition, the error check units 306, 316 send, to the disparity estimation unit 320 of the error correction unit 310, the block number of the error block in which an error was detected, and a signal instructing the correction of the decoding error.

Subsequently, the error correction unit 310 corrects the decoding error. Here, the respective picture pairs in the stereoscopic dynamic image data have the same (or substantially the same) block as the error block. Thus, if the paired picture of the error picture in which the decoding error occurred is normally decoded, an original block that was not decoded due to an error is contained in the paired picture. By leveraging this fact, the error correction unit 310 extracts the original block from the paired picture of the error picture and applies that original block to the error block in the error picture, and thereby corrects the decoding error. However, since the original block of the paired picture is located at a position shifted by an amount of disparity from the position of the error block in the paired picture, the original block is not obtained even if the block in the position of the error block is extracted. Thus, the disparity estimation unit 320 performs disparity estimation processing of estimating the disparity of the error block in the error picture. The disparity estimation processing will be explained later.

When the disparity estimation processing is executed, the image correction unit 322 corrects the decoding error by applying to the error block, among the blocks contained in the paired picture of the error picture, a block that is located at a position shifted from the position of the error block by an amount of the estimated disparity. Consequently, the decoding error can be corrected by using a block that is (substantially) same as the original block.

In addition, the picture in which the decoding error was corrected is transferred from the image correction unit 322 to the frame memory 308 or 318, and stored in the frame memory 308 or 31. In addition, the stereoscopic dynamic image data 309, 319 respectively containing left and right pictures are read from the frame memories 308, 318.

[Disparity Estimation Processing]

The disparity estimation processing in this embodiment is now explained. In the disparity estimation processing, the disparity estimation unit 320 obtains the estimated disparity from a picture pair, among the picture pairs that have been decoded before the error picture, having an approximate picture that is most appropriate to the error picture. For example, in the case of scenes with much movement such as where the shape and position of the subject continuously changes as with a fountain, waterfall, confetti, and leaves blowing in the wind, while the difference of blocks between consecutive pictures is great, when viewing this at a cycle of a certain number of pictures, the shape and position of the subject are repeated, and the probability that a picture having a very approximate block exists is high. Thus, the disparity estimation unit 320 selects a picture pair, among the picture pairs that have been decoded in the past, containing the approximate picture including a block that is approximate to the error block, and obtains, as the estimated disparity, the disparity of the location corresponding to the error block in that picture pair. Note that, in the ensuing explanation, the location corresponding to the error block Xn in the picture other than the error picture is referred to as an "error corresponding-location" for the sake of convenience. Here, since the error block has not been decoded and is not compared, the picture pair in which the peripheral blocks are approximate is selected by leveraging the fact that the probability that the error block and the peripheral blocks in the periphery thereof are approximate is high.

Figure 4:
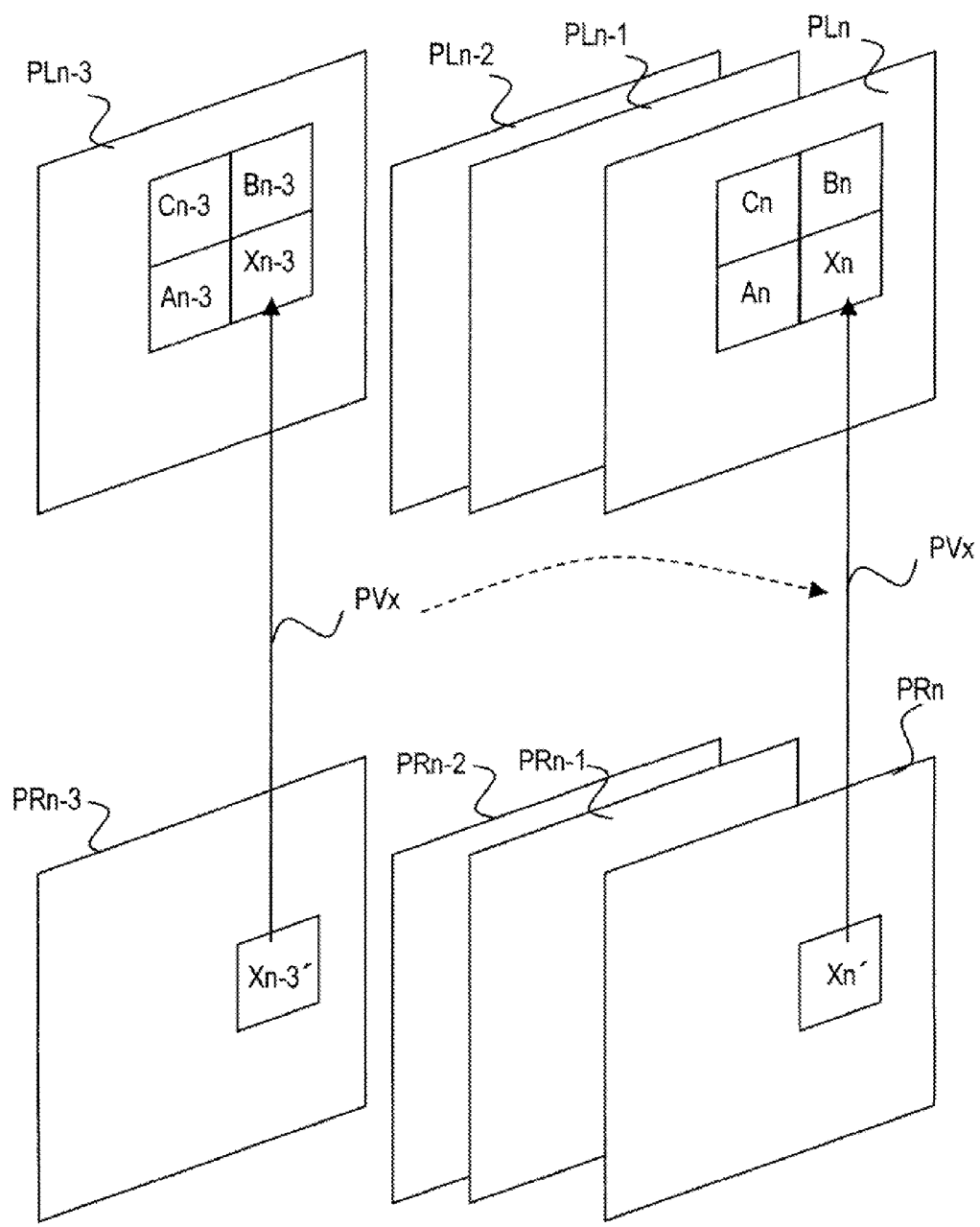
FIG. 4 is a diagram explaining the disparity estimation processing.

FIG. 4 is a diagram explaining the disparity estimation processing. FIG. 4 illustrates left eye pictures PLn−3, PLn−2, PLn−1, PLn, and right eye pictures PRn−3, PRn−2, PRn−1, PRn. Here, let it be assumed that decoding is performed in the order of pictures PRn−3, PLn−3, PRn−2, PLn−2, PRn−1, PRL−1, PRn, PLn, and a decoding error is detected in the block Xn upon decoding the picture PLn.

The disparity estimation unit 320 selects, from the decoded picture pairs, a picture pair containing blocks that are most approximate to the peripheral blocks in the periphery of the error block Xn in the error picture PLn. The decoded picture pairs are read from the frame memories 308, 318. The peripheral blocks of the error block Xn are, for example, a block An that was encoded and decoded previously in the same line as the error block Xn, a block Bn included in the preceding block line of the error block Xn and positioned on the error block Xn, and a block Cn that was encoded and decoded previously thereto. The respective peripheral blocks are, for example, macro blocks or variable blocks. Note that the peripheral blocks will suffice so as long as they are normally decoded blocks, and the number and position thereof are not limited to the examples described herein.

The disparity estimation unit 320 compares the peripheral blocks An, Bn, and Cn in the picture PLn with the blocks of the same position in the respective decoded pictures PLn−3 to PLn−1 of the same viewpoint, and calculates the difference thereof; for instance, calculates the sum of squared difference. Note that the number of past pictures to be compared may be an arbitrary number of 1 or higher. Here, for example, the most recent three pictures of pictures PLn−3, PLn−2, and PLn−1 are the targets of comparison. Subsequently, the disparity estimation unit 320 selects the picture pair including the approximate picture in which the total value of each sum of squared difference becomes minimum. Here, for example, let it be assumed that the approximate picture PLn−3 and the paired picture PRn−3 thereof are selected.

The disparity estimation unit 320 obtains the disparity of the error corresponding-location in the selected approximate picture PLn−3 and the paired picture PRn−3 thereof; that is, the disparity of the block Xn−3 corresponding to the error block Xn. Specifically, the disparity estimation unit 320 detects, from the picture PRn−3, the bock Xn−3' which coincides with or substantially coincides with (for instance, the sum of squared difference of the pixel values becomes minimum) the block Xn−3 of the error corresponding-location based on matching with each block. In addition, the disparity estimation unit 320 calculates the disparity vector Pvx of the blocks Xn−3 and Xn−3' from the difference in the positions. The disparity vector Pvx is used as the estimated disparity vector Pvx; that is, as the estimated disparity.

In addition, the image correction unit 322 extracts, among the blocks contained in the picture PRn, the block Xn' located at the position shifted by an amount of the estimated disparity from the error corresponding-location; that is, shifted by an amount of the estimated disparity vector Pvx. Subsequently, the image correction unit 322 applies the extracted block Xn to the error block Xn of the picture PLn, and thereby corrects the decoding error.

Accordingly, since a picture pair including the approximate picture having the most approximate peripheral blocks from the past picture pairs is selected, the probability that the block of the error corresponding-location will be approximate to the original error block in the selected picture pair becomes high. In addition, as a result of using, as the estimated disparity, the disparity of the error corresponding-location in the selected picture pair, the disparity of the error block can be estimated more accurately. Thus, it is possible to accurately extract the blocks to be used for correction from the paired picture, and improve the correction accuracy of the decoding error. In particular, even in cases when the difference between the pictures adjacent in the time direction is great such as in scenes with much movement and consequently the difference with the original error block will increase if the blocks of the error corresponding-location in the preceding picture of the same viewpoint as the error picture are used, the decoding error can be corrected accurately. Moreover, for example, with CABAC and the like in H.246, when a decoding error occurs in one macro block in the raster-scan direction, there are cases where the decoding process of the subsequent macro block in the slice containing that macro block collapses, but such a situation can be avoided in the present embodiment.

[Operation Process Example]

The operation process example of the decoding unit 107 in this embodiment is now explained.

Figure 5:
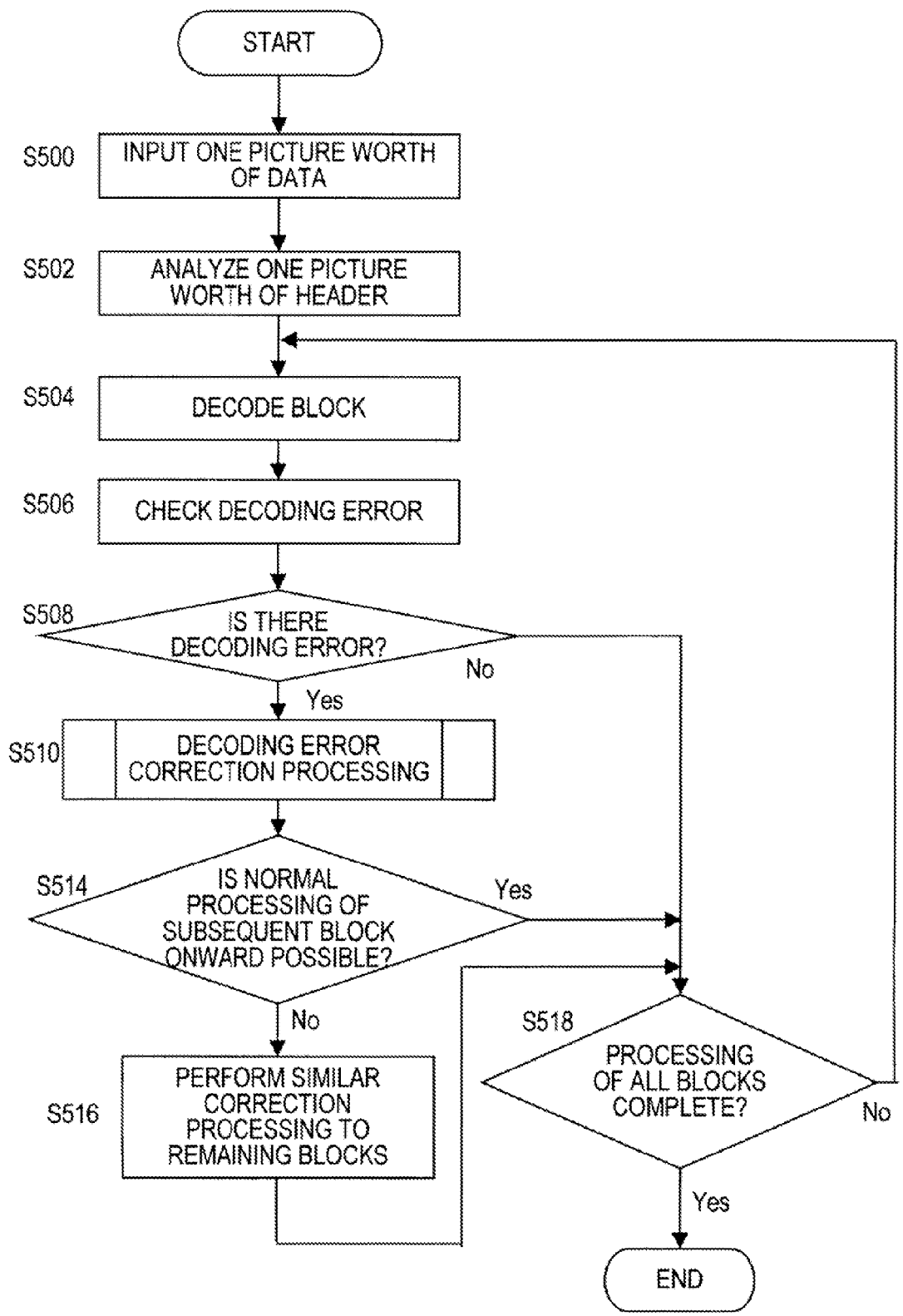
FIG. 5 is a flowchart illustrating the operation process example of the decoding unit.

FIG. 5 is a flowchart illustrating the operation process example of the decoding unit 107. The process of FIG. 5 is executed for each picture. Foremost, one picture worth of data is input to the header analyzing units 302, 312, respectively (S500). Subsequently, the header analyzing units 302, 312 respectively analyze one picture worth of header (S502), and perform the analysis of the NAL unit.

Subsequently, the block decoding units 304, 314 respectively decode blocks (for instance, macro blocks) (S504). In addition, the error check units 306, 316 respectively check whether a decoding error of the respective blocks was detected (S506). When a decoding error is not detected (S508: No), step S518 is executed. Meanwhile, when a decoding error is detected (S508: Yes), the error correction unit 310 performs the correction processing of the decoding error (S510). In addition, the block decoding units 304, 314 confirm whether the decoding process of the subsequent block is possible (S514). When the decoding error is corrected in step S510 (in addition, when the data of the header is not destroyed), the subsequent block can be decoded. Thus, in such a case (S514: Yes), the processing proceeds to step S518. Meanwhile, when the decoding error is not corrected in step S510 and the subsequent block is not decoded (S514: No), the error correction unit 310 performs similar correction processing on the last block of that slice (S516). Consequently, error correction can be performed in one slice, and it is possible to avoid a situation where the blocks are not decoded in the remaining slices in one picture.

In step S518, the block decoding units 304, 314 respectively confirm whether the decoding of all blocks in one picture is complete. In addition, until the decoding of all blocks is complete (S518: No), steps S504 to S516 are repeated. Meanwhile, when the decoding of all blocks is complete (S518: Yes), the error check units 306, 316 respectively store the data of one picture in the frame memories 308, 318. Then, step S500 is executed for the subsequent picture.

Figure 6:
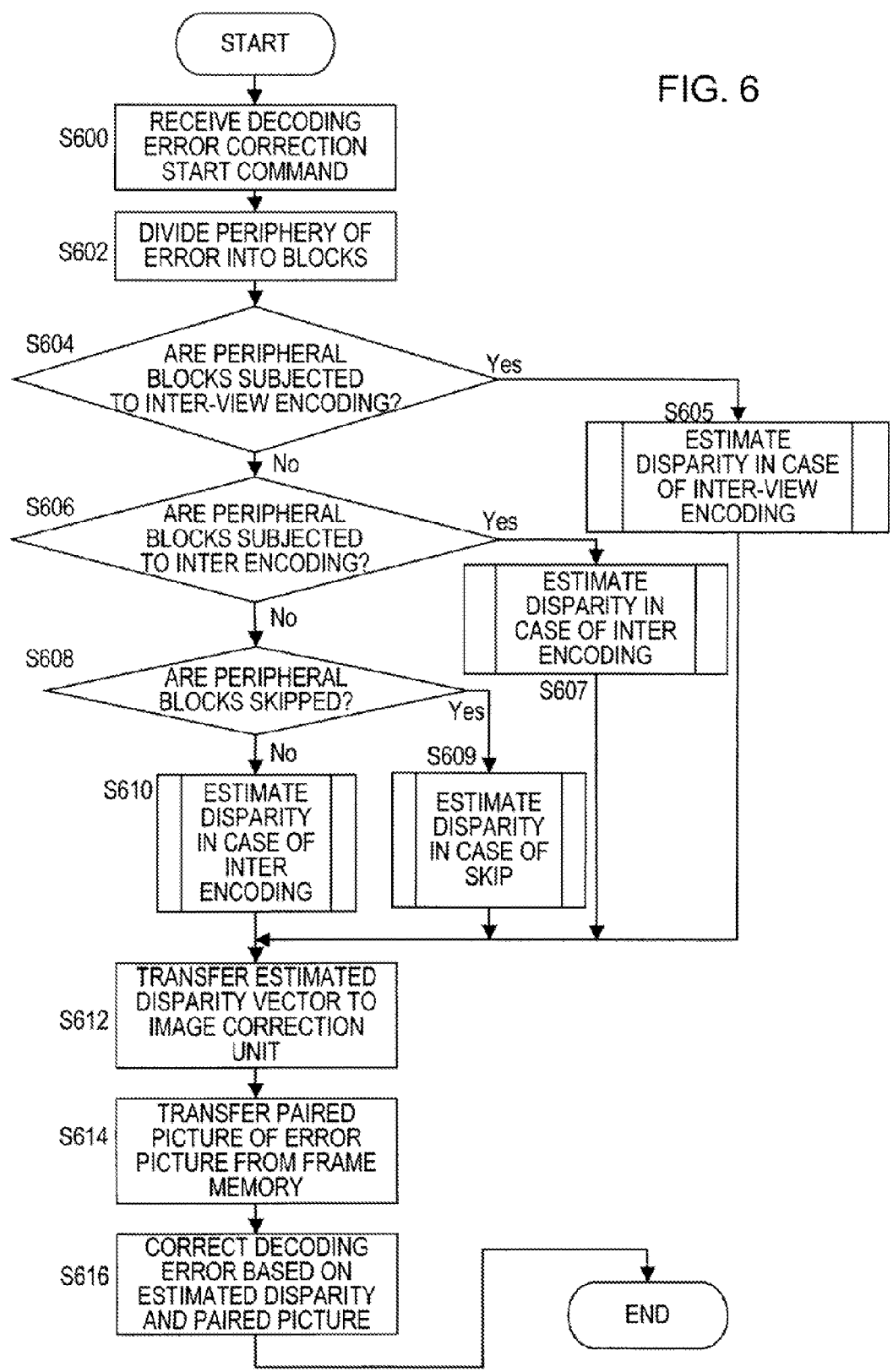
FIG. 6 is a flowchart illustrating a detailed process example of the decoding error correction processing.

FIG. 6 is a flowchart illustrating a detailed process example of the decoding error correction processing. The process of FIG. 6 corresponds to the subroutine of step S510 of FIG. 5. In this process example, in addition to the disparity estimation processing illustrated in FIG. 4, different disparity estimation processing is selectively executed according to the encoding method of the peripheral blocks that are peripheral to the error block.

The disparity estimation unit 320 receives a control signal from the error check unit 306 or 316 instructing the start of error correction (S600). Subsequently, the disparity estimation unit 320 divides the periphery of the error block into block (macro block or variable block) units (S602). For example, as illustrated in FIG. 4, the error block is divided into peripheral blocks An, Bn, and Cn. In addition, the disparity estimation unit 320 determines the disparity estimation processing to be executed according to the encoding method of the peripheral blocks that are sent from the error check units 304, 314.

For example, when even one of the peripheral blocks has been subjected to inter-view encoding (S604: Yes), the disparity estimation processing in the case of inter-view encoding is executed (S605). In the foregoing case, the probability that the difference of the picture pair is smaller than the difference between pictures in the time direction is high. Thus, the estimated disparity is obtained from the disparity of the peripheral blocks in the picture pair containing the error picture. Consequently, high accurate disparity estimation processing is enabled.

Figure 7:
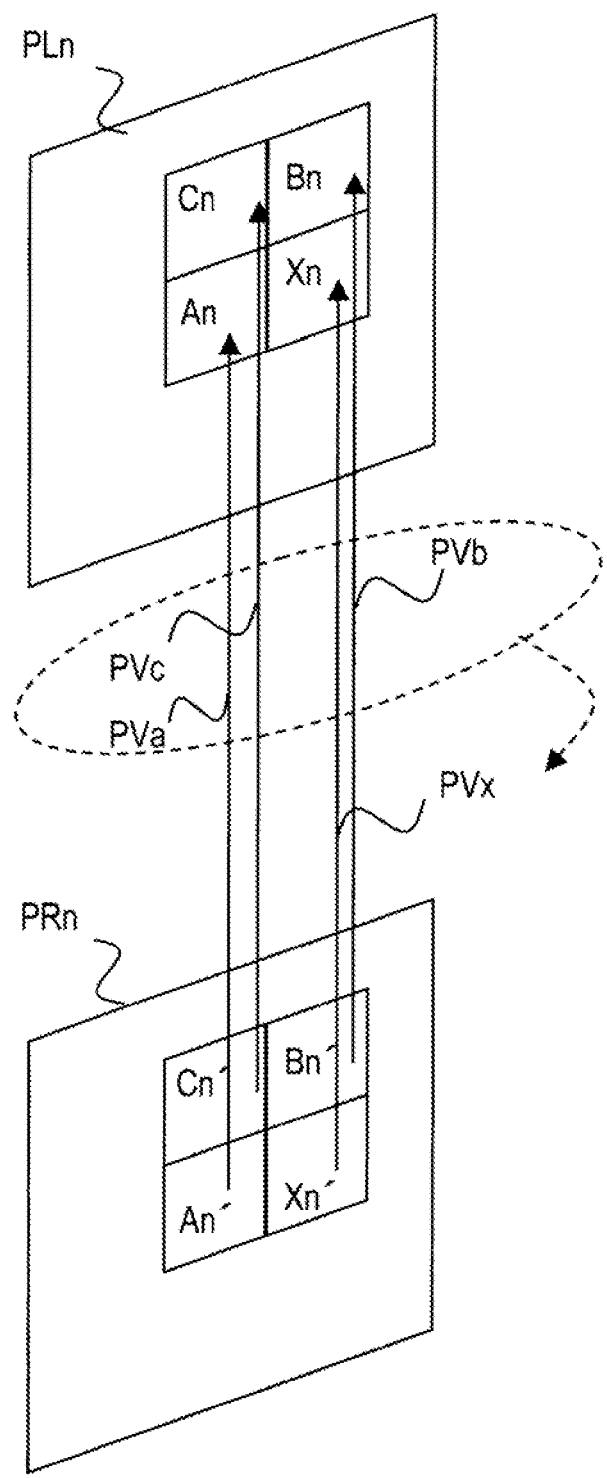
FIG. 7 is a diagram explaining the disparity estimation processing in the case of inter-view encoding.
Figure 8:
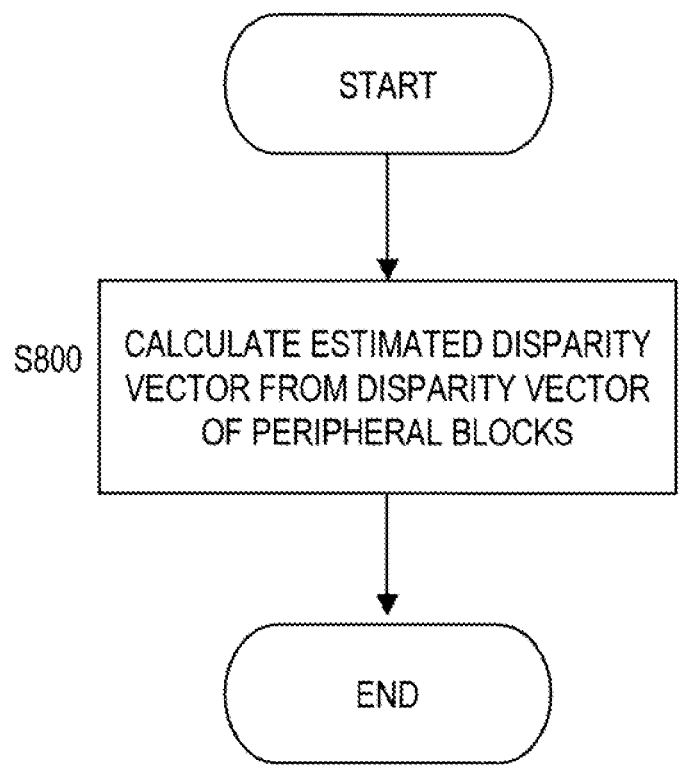
FIG. 8 is a flowchart illustrating the process example thereof, and corresponds to the subroutine of step S605.

Here, the disparity estimation processing in the case of inter-view encoding is explained with reference to FIGS. 7 and 8. FIG. 7 is a diagram explaining the disparity estimation processing in the case of inter-view encoding. Moreover, FIG. 8 is a flowchart illustrating the process example thereof, and corresponds to the subroutine of step S605.

FIG. 7 illustrates an error block Xn in the error picture PLn, and the peripheral blocks An, Bn, and Cn illustrated in FIG. 4 as an example of the predetermined peripheral blocks in the periphery thereof. When any one of the peripheral blocks An, Bn, and Cn is subjected to inter-view encoding and decoding, the probability that the error block Xn was also subjected to inter-view encoding by using the disparity vectors that are approximate to the disparity vectors of the peripheral block is high. Thus, the disparity estimation unit 320 calculates the estimated disparity vector from the disparity vectors Pva, Pvb, and Pvc of the peripheral blocks An, Bn, and Cn in the picture pair PLn, PRn (S800 of FIG. 8). Here, the disparity vectors Pva, Pvb, and Pvc are the vectors of the reference blocks An', Bn', and Cn' in the picture PRn of the respective peripheral blocks An, Bn, and Cn.

Specifically, when one among the peripheral blocks An, Bn, and Cn was subjected to inter-view encoding and decoding, the disparity vector of the peripheral block thereof is used as the estimated disparity vector, and when two or more among the peripheral blocks An, Bn, and Cn were subjected to inter-view encoding and decoding, the average of the disparity vectors of such peripheral blocks is used as the estimated disparity vector. The average of the plurality of disparity vectors is, for example, a vector in which the average of the horizontal direction component and the vertical direction component of the plurality of disparity vectors as the component.

Returning to FIG. 6, when an inter-view encoded block is not included in the peripheral block (S604: No), and at least one peripheral block has been subjected to inter encoding (S606: Yes), the disparity estimation processing in the case of inter encoding is executed (S607). In the foregoing case, the probability that the difference between the error picture and the picture including the reference block of the inter prediction is smallest is high. Thus, the estimated disparity is obtained from the disparity of the peripheral blocks in the picture pair containing the reference block.

Figure 9:
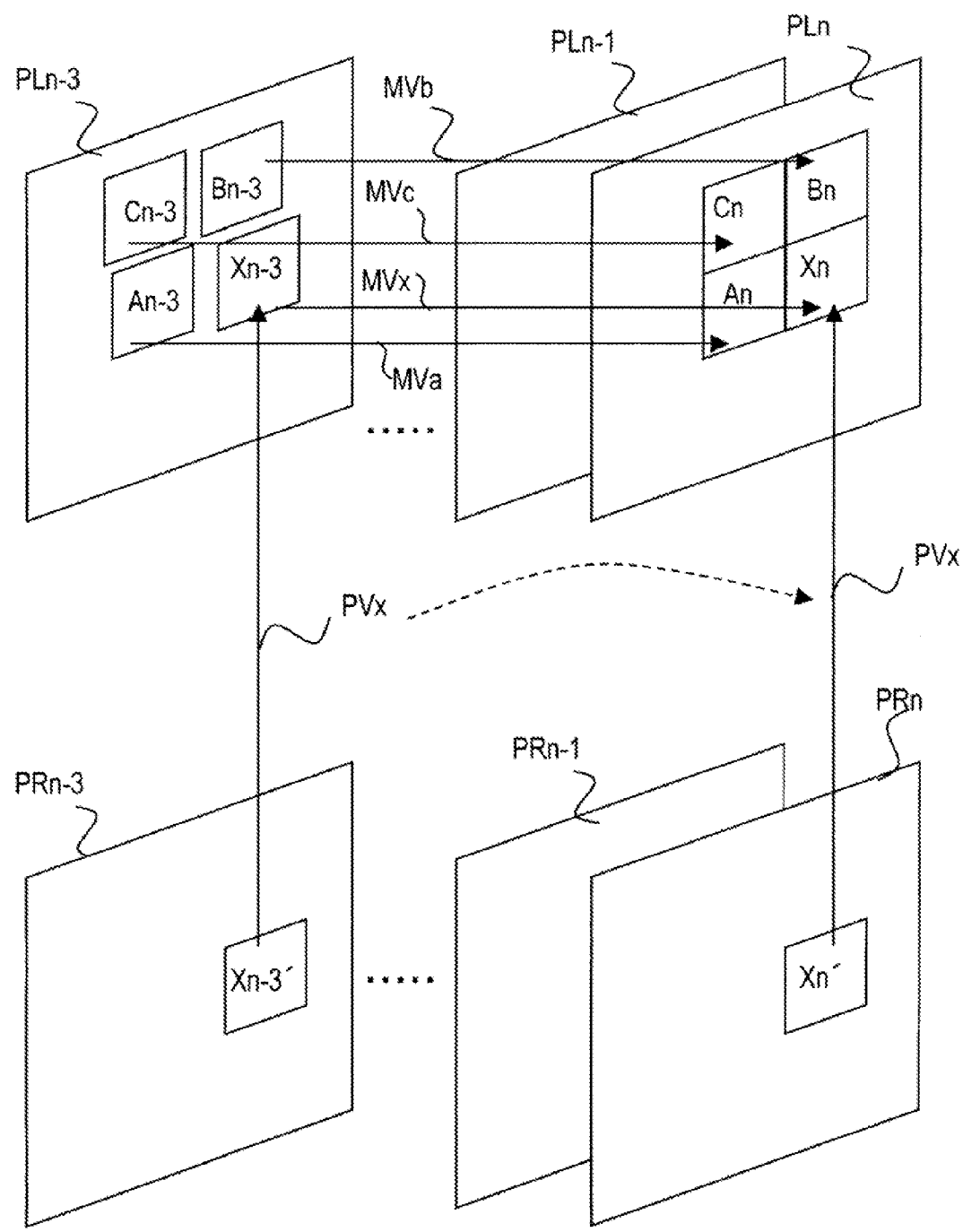
FIG. 9 is a diagram explaining the disparity estimation processing in the case of inter encoding.

Here, the disparity estimation processing in the case of inter encoding is explained with reference to FIGS. 9 and 10. FIG. 9 is a diagram explaining the disparity estimation processing in the case of inter encoding. Moreover, FIG. 10 is a flowchart illustrating the process example thereof, and corresponds to the subroutine of step S607.

FIG. 9 illustrates the error block Xn in the error picture PLn, and predetermined peripheral blocks An, Bn, and Cn that are peripheral to the error block Xn. Here, the peripheral blocks An, Bn, and Cn do not include a block that was subjected to inter-view encoding and decoding, and at least one of was subjected to inter encoding and decoding. In the foregoing case, the probability that the error block Xn was also subjected to inter encoding by using the motion vectors that are approximate to the motion vectors of the peripheral blocks is high. Thus, the disparity estimation unit 320 obtains the estimated disparity based on the picture pair containing the reference blocks of the peripheral blocks. Note that, when a plurality of peripheral blocks is subjected to inter encoding and decoding, the reference blocks of the respective peripheral blocks may be in a different picture. However, for the sake of convenience of explanation, indicated is a case where the reference blocks An-3, Bn-3, and Cn-3 of the peripheral blocks An, Bn, and Cn are all contained in the picture PLn-3.

Figure 10:
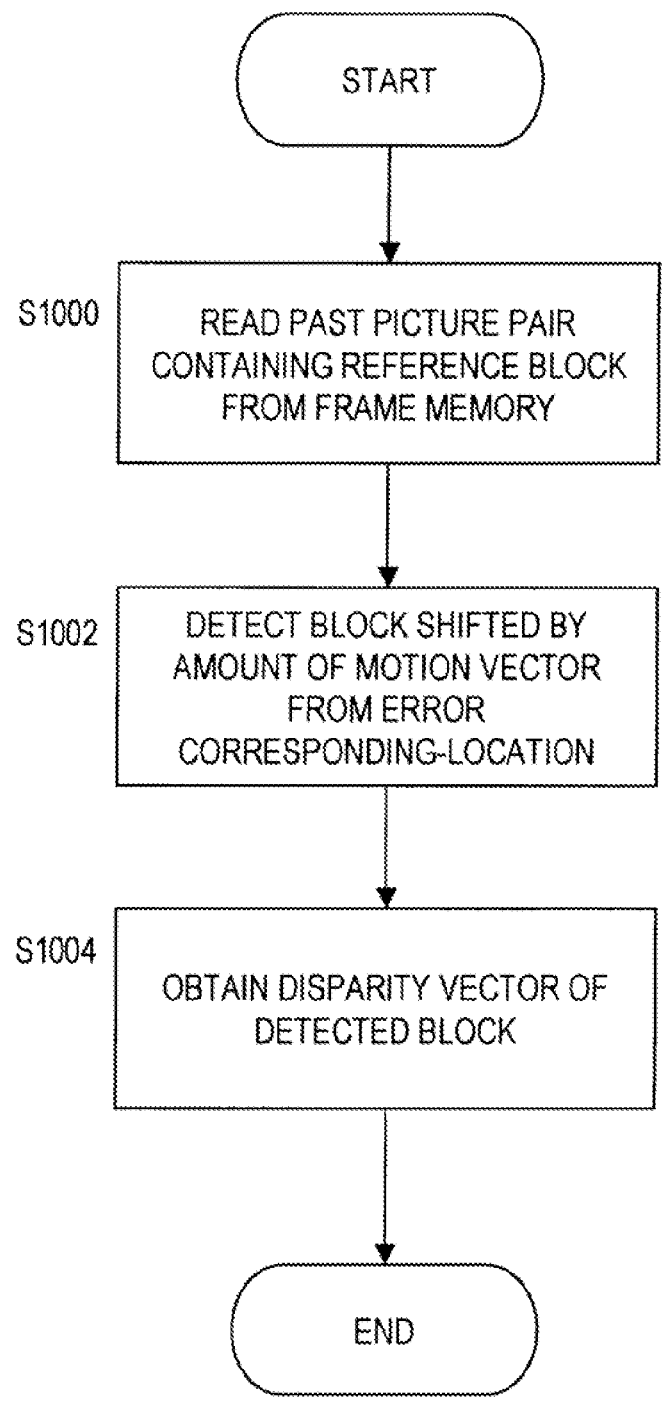
FIG. 10 is a flowchart illustrating the process example thereof, and corresponds to the subroutine of step S607.

Foremost, the disparity estimation unit 320 reads, from the frame memory 308 or 318, a past picture pair including the reference blocks to be referred to in the inter encoding of the peripheral blocks (S1000 of FIG. 10). For example, the picture pair PLn-3, PRn-3 containing the reference blocks An-3, Bn-3, and Cn-3 of the peripheral blocks An, Bn, and Cn is read.

In addition, the disparity estimation unit 320 estimates the motion vector of the error block from the motion vectors of the peripheral blocks. Subsequently, the disparity estimation unit 320 detects the block Xn-3 corresponding to the error block Xn located at a position shifted by an amount of the motion vector Mvx from the error corresponding-location is detected in the picture containing the reference blocks (S1004).

The disparity estimation unit 320, for example, preliminarily sets the priority in the order of the peripheral blocks An, Bn, and Cn, and, when the peripheral block An is subjected to inter encoding and decoding, estimates the motion vector Mva thereof as the motion vector Mvx of the error block Xn, and detects the block Xn-3 corresponding to the error block Xn by using the motion vector Mva in the picture PLn-3 containing the reference block An-3. Alternatively, when the peripheral block An has not been subjected to inter encoding and decoding and the peripheral block Bn has been subjected to inter encoding and decoding, the disparity estimation unit 320 estimates the motion vector Mvb as the motion vector Mvx of the error block Xn, and detects the block Xn-3 corresponding to the error block Xn by using the motion vector Mvb in the picture PLn-3 containing the reference block Bn-3. Alternatively, when the peripheral blocks An, Bn have not been subjected to inter encoding and decoding, and the peripheral block Cn has been subjected to inter encoding and decoding, the disparity estimation unit 320 estimates the motion vector Mvc as the motion vector Mvx of the error block Xn, and detects the block Xn-3 corresponding to the error block Xn by using the motion vector Mvc in the picture PLn-3 containing the reference block Cn-3.

Subsequently, the disparity estimation unit 320 calculates the disparity vector of the detected block Xn-3 as the estimated disparity vector (S1004). For example, the disparity estimation unit 320 detects the block Xn-3' which coincides with or substantially coincides with the block Xn-3 in the paired picture PRn-3 of the picture PLn-3 by performing matching with each variable block. Subsequently, the disparity estimation unit 320 obtains band uses the disparity vector Pvx of the blocks Xn-3 and Xn-3' as the estimated disparity vector.

Returning to FIG. 6, when a block that was subjected to inter-view encoding or inter encoding is not included in the peripheral blocks (S606: No), and even one block has been skipped (S608: Yes), the disparity estimation processing in the case of a skip is executed (S609). As described above, skip includes a case where the reference block of the preceding picture of the same viewpoint is used, and a case where the reference block of the simultaneous paired picture is used. When the reference block of the preceding picture of the same viewpoint is used, since the probability that the block of the error corresponding-location in the preceding picture is being used as is as the error block is high, the disparity of that block is used as the estimated disparity. Moreover, when the reference block of the simultaneous paired picture is used, the probability that the disparity of the error block and the disparity of the peripheral blocks are approximate is high since the error block and the peripheral block are approximate, and the disparity of the peripheral blocks is used as the estimated disparity. Note that the direct mode of the B picture is also determined as a skip.

Figure 11:
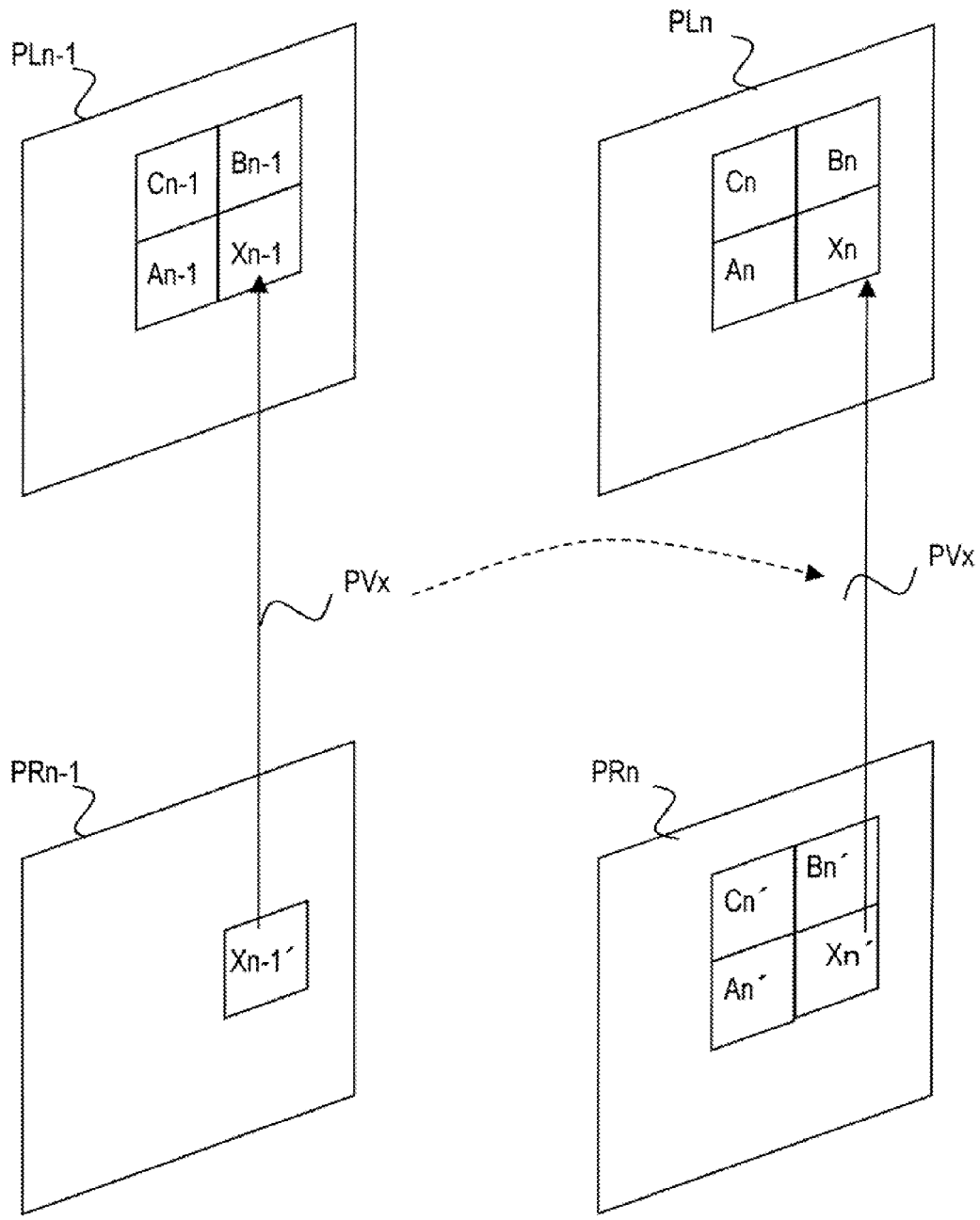
FIG. 11 is a diagram explaining the disparity estimation processing in the case of a skip.

Here, the disparity estimation processing in the case of a skip is explained with reference to FIG. 11, FIG. 12A, and FIG. 12B. FIG. 11 is a diagram explaining the disparity estimation processing in the case of a skip. Moreover, FIG. 12A and FIG. 12B are flowcharts illustrating the process example thereof, and both correspond to the subroutine of step S609.

In FIG. 11, one or more predetermined peripheral blocks An, Bn, and Cn that are peripheral to the error block Xn in the error picture PLn are skipped. For example, when the skip of directly applying the reference block An-1, Bn-1, or Cn-1 of the preceding picture PLn-1 is being performed, the process of FIG. 12A is executed. The disparity estimation unit 320 reads, from the frame memory 308 or 318, the picture of the skipped reference block; that is, the preceding picture PLn-1 of the same viewpoint (S1200). Subsequently, the disparity estimation unit 320 divides the periphery of the error corresponding-location in the read picture PLn-1 into blocks (S1202), detects the blocks of the error corresponding-location, and calculates the disparity vector thereof (S1204). Here, for example, the block Xn-1' coinciding with the block Xn-1 of the error corresponding-location detected in the picture PLn-1 is detected from the picture PRn-1 based on matching. In addition, the disparity vector PVx of the blocks Xn-1 and Xn-1' is calculated and used as the estimated disparity vector.

Meanwhile, when the skip of directly applying the reference block An', Bn' or Cn' of the simultaneous paired picture PRn is being performed, the process of FIG. 12B is executed. The disparity estimation unit 320 calculates the disparity vector of the peripheral block An, Bn or Cn in the picture PLn, and uses that disparity vector as the estimated disparity vector (S1200b). The disparity of the peripheral block An, Bn or Cn is the disparity vector of each peripheral block An, Bn or Cn and the peripheral block An', Bn' or Cn' in the picture PRn. When there is a plurality of disparity vectors, the average thereof is used as the estimated disparity vector.

Returning to FIG. 6, when a block that was subjected to inter-view encoding, inter encoding, or skip is not included in the peripheral blocks; that is, when all peripheral blocks have been subjected to intra encoding (S608: No), the disparity estimation processing in the case of intra encoding is executed (S610). Here, the disparity estimation processing of this embodiment explained with reference to FIG. 4 is executed.

Figure 13:
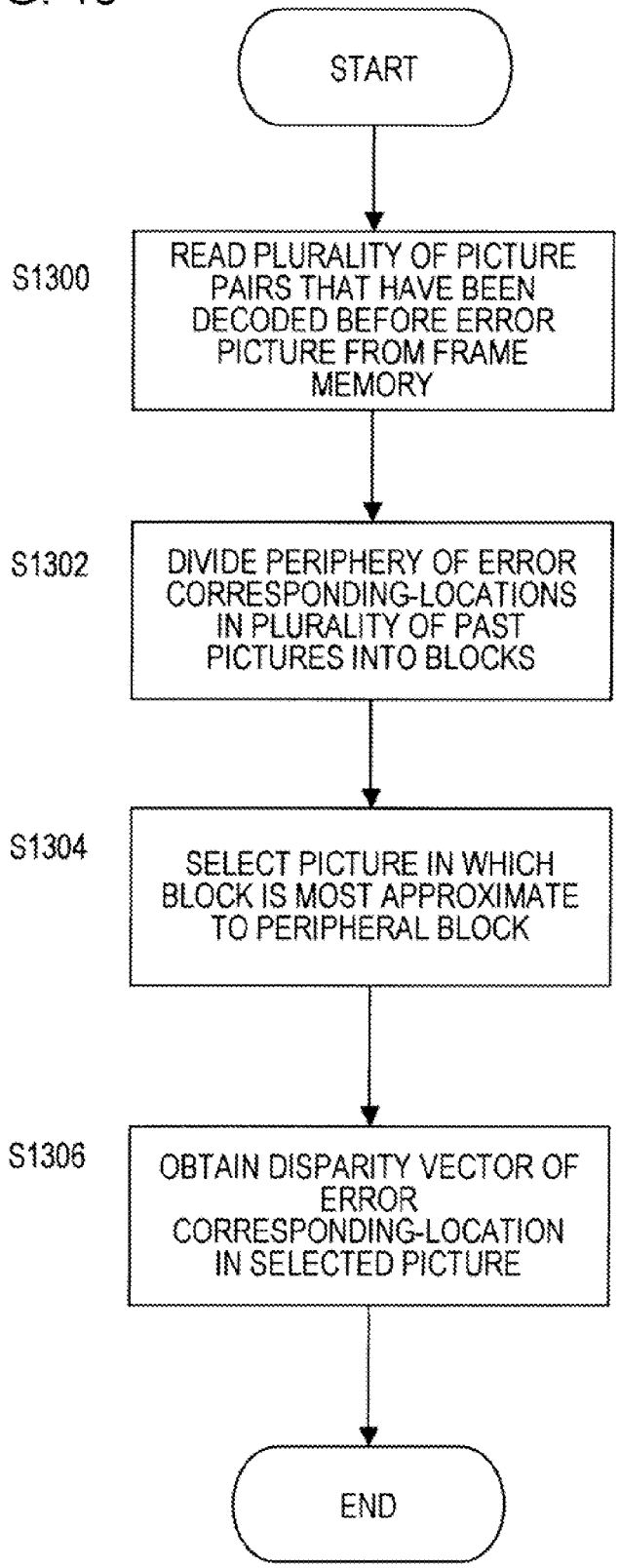
FIG. 13 is a flowchart illustrating a process example of the disparity estimation processing in the case of intra encoding, and corresponds to the subroutine of step S610.

FIG. 13 is a flowchart illustrating a process example of the disparity estimation processing in the case of intra encoding, and corresponds to the subroutine of step S610. The disparity estimation unit 320 reads, from the frame memory 308 or 318, a plurality of picture pairs that have been decoded before the error picture (S1300). Subsequently, the disparity estimation unit 320 divides the periphery of the error corresponding-location in the acquired picture into blocks (S1302). For instance, in the example illustrated in FIG. 4, the periphery of the error corresponding-location is divided into blocks corresponding to the peripheral blocks An, Bn, and Cn in the respective pictures PLn−3 to PLn−1. Subsequently, the disparity estimation unit 320 selects the picture in which the blocks of the same position as the peripheral blocks An, Bn, and Cn are the most approximate (S1304). For instance, in the example illustrated in FIG. 4, the picture PLn−3 is selected. Subsequently, the disparity estimation unit 320 calculates the disparity vector of the error corresponding-location in the selected picture (S1306). For instance, in the example illustrated in FIG. 4, the disparity vector Pvx of the block Xn−3 in the picture pair PLn−3, PRn−3 s calculated.

Returning to FIG. 6, subsequent to the disparity estimation processing in the case of each of the encoding processes described above, the disparity estimation unit 320 transfers, to the image correction unit 322, the estimated disparity vector which corresponds to the estimated disparity (S612). Subsequently, the paired picture of the error picture is transferred from the frame memory 308 or 318 to the image correction unit 322 (S614). In addition, the image correction unit 322 extracts the block for performing error correction from the paired picture based on the estimated disparity, applies that block to the error block, and thereby corrects the decoding error (S616).

According to the foregoing process, highly accurate disparity estimation according to the encoding method is enabled, and the error correction accuracy will consequently improve. For example, while this will also depend on the encoding efficiency, when the inter-view encoding or skip from the paired picture is adopted because the correlation of the time direction in the peripheral blocks is low but the correlation in the picture pair is high (that is, because the disparity is small), even if there is a difference between the estimated disparity and the original disparity when the disparity vector of the peripheral blocks is used as the estimated disparity, the error can be minimized. Thus, the disparity estimation can be performed with accuracy.

Moreover, when inter encoding or skip from the preceding picture is adopted because the correlation in the time direction is higher than the case of inter-view encoding or skip from the paired picture, with a picture pair containing the reference blocks of the peripheral blocks, since the probability that the block of the error corresponding-location will be approximate to the original block is high, the disparity estimation can be performed with accuracy by using the disparity of the error corresponding-location as the estimated disparity.

In addition, even in cases where intra encoding is adopted because the correlation between pictures is lowest in the time direction and the picture pair, the disparity estimation can be performed with accuracy by selecting the picture pair containing the block that is approximate to the peripheral block of the error picture from a past picture pair, and using the disparity of the error corresponding-location in that picture pair as the estimated disparity. In the foregoing case, in comparison to the case where inter-view encoding or skip from the paired picture is used in the peripheral blocks, the disparity of the peripheral blocks will increase. Thus, upon calculating the disparity of the peripheral blocks and using that disparity as the estimated disparity, since the estimated disparity is relatively large, there is a possibility that the error between the estimated disparity and the original disparity will increase. Nevertheless, by selecting the picture pair containing the block that is approximate to the peripheral block of the error picture from a past picture pair, and using the disparity of the error corresponding-location in that picture pair as the estimated disparity, disparity estimation processing of even higher accuracy is enabled.

The modified examples of the disparity estimation processing in the case of intra encoding in this embodiment are now explained.

First Modified Example

In the first modified example, in substitute for selecting a picture, among the plurality of pictures that have been decoded in the past, including a block that is most approximate to the peripheral blocks in the error picture, the disparity estimation unit 320 obtains the average of disparities of the blocks of the error corresponding-locations in the plurality of pictures that have been decoded in the past, and using such average as the estimated disparity.

Figure 14:
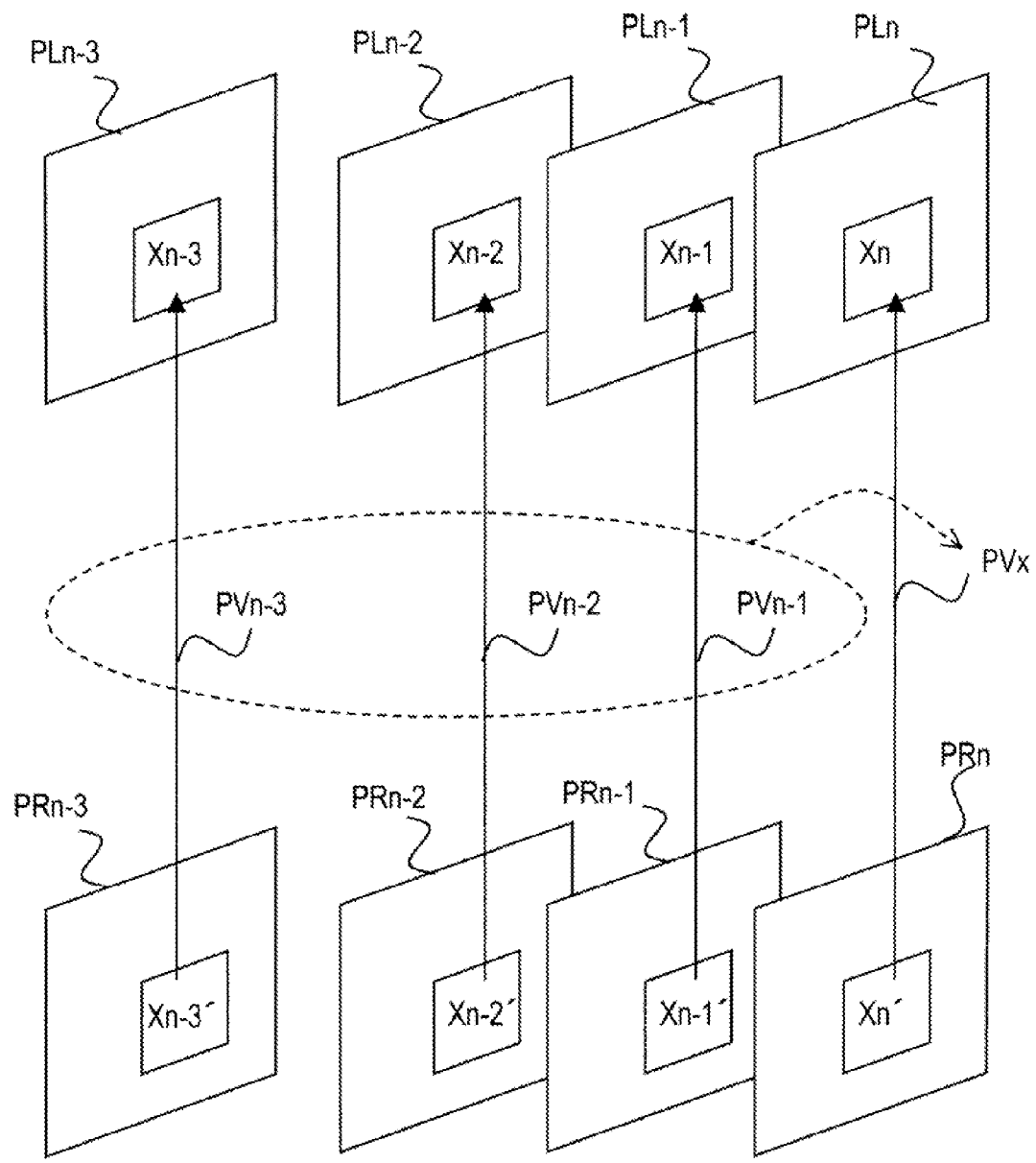
FIG. 14 is a diagram explaining the disparity estimation method in the first modified example.

FIG. 14 is a diagram explaining the disparity estimation method in the first modified example. FIG. 14 illustrates a picture pair of error pictures PLn and picture PRn, and picture pairs PLn−1, PRn−1, picture pairs PLn−2, PRn−2, and picture pair PLn−3, PRn−3 that have been decoded in the past. Moreover, in the pictures PLn−3 to PLn−1, the blocks Xn−3 to Xn−1 are the blocks of the error corresponding-location. The disparity estimation unit 320 respectively detects, in the pictures PRn−3 to PRn−1, the blocks Xn−3' to Xn−1' that (substantially) coincide with the blocks Xn−3 to Xn−1, for example, based on the matching of each variable block. In addition, the disparity estimation unit 320 respectively obtains, in each picture pair, the disparity vectors of the blocks Xn−3 to Xn−1; that is, the disparity vectors Pvn−3 to Pvn−1 between the blocks Xn−3 to Xn−1 and the blocks Xn−3' to Xn−1', and uses the disparity vector Pvx as the average thereof as the estimated disparity vector Pvx.

Figure 15:
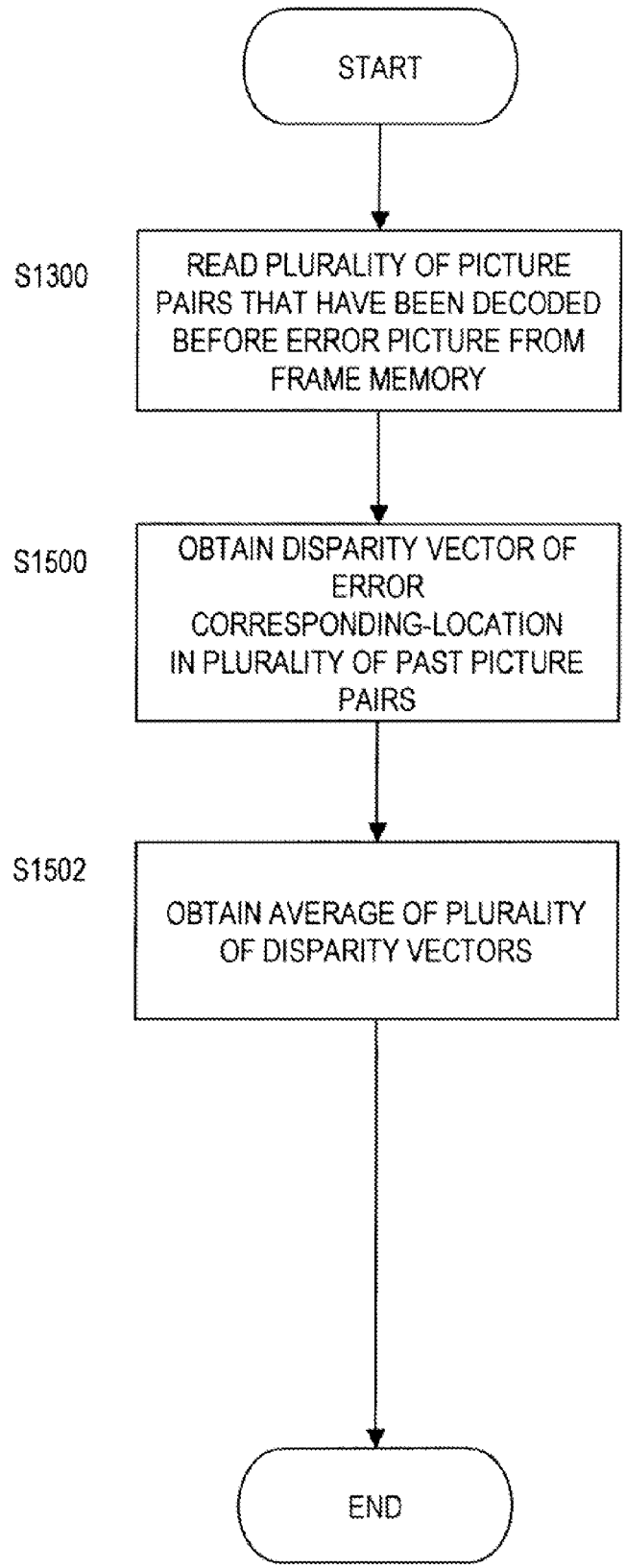
FIG. 15 is a flowchart illustrating the disparity estimation process in the first modified example.

FIG. 15 is a flowchart illustrating the disparity estimation process in the first modified example. The process of FIG. 15 corresponds to a modified example of the process of FIG. 13. The same process as FIG. 13 is given the same reference numeral as FIG. 13. The disparity estimation unit 320 reads a plurality of pictures that have been decoded in the past from the frame memory 308 or 318 (S1300). Subsequently, the disparity estimation unit 320 calculates the disparity vectors of the blocks of the error corresponding-location in the plurality of picture pairs that have been decoded in the past (S1500). For example, in the example illustrated in FIG. 15, the disparity vectors Pvn−3 to PVn−1 of the blocks Xn−3 to Xn−1 in the pictures PLn−3 to PLn−1 and PRn−3 to PRn−1 are obtained. Subsequently, the disparity estimation unit 320 calculates the average of the obtained disparity vectors (S1502). For instance, in the example illustrated in FIG. 15, the disparity vector Pvx is calculated as the average of the disparity vectors Pvn−3 to PVn−1 and used as the estimated disparity vector.

According to the foregoing first modified example, even in cases where the correlation between the pictures in the time direction is low, the disparity estimation processing can be performed accurately. Note that, as a further modified example, it is also possible to use the time average of the disparity vectors of the peripheral blocks of the error block as the estimated disparity vector.

Second Modified Example

In the second modified example, in substitute for calculating the average of the plurality of disparity vectors in the first modified example, the intermediate value of the plurality of disparity vectors is used as the estimated disparity vector. The processing load can be alleviated in comparison to the case of calculating the average. Note that, as a further modified example, the intermediate value of the disparity vectors of the peripheral blocks of the error block may also be used as the estimated disparity vector.

Figure 16:
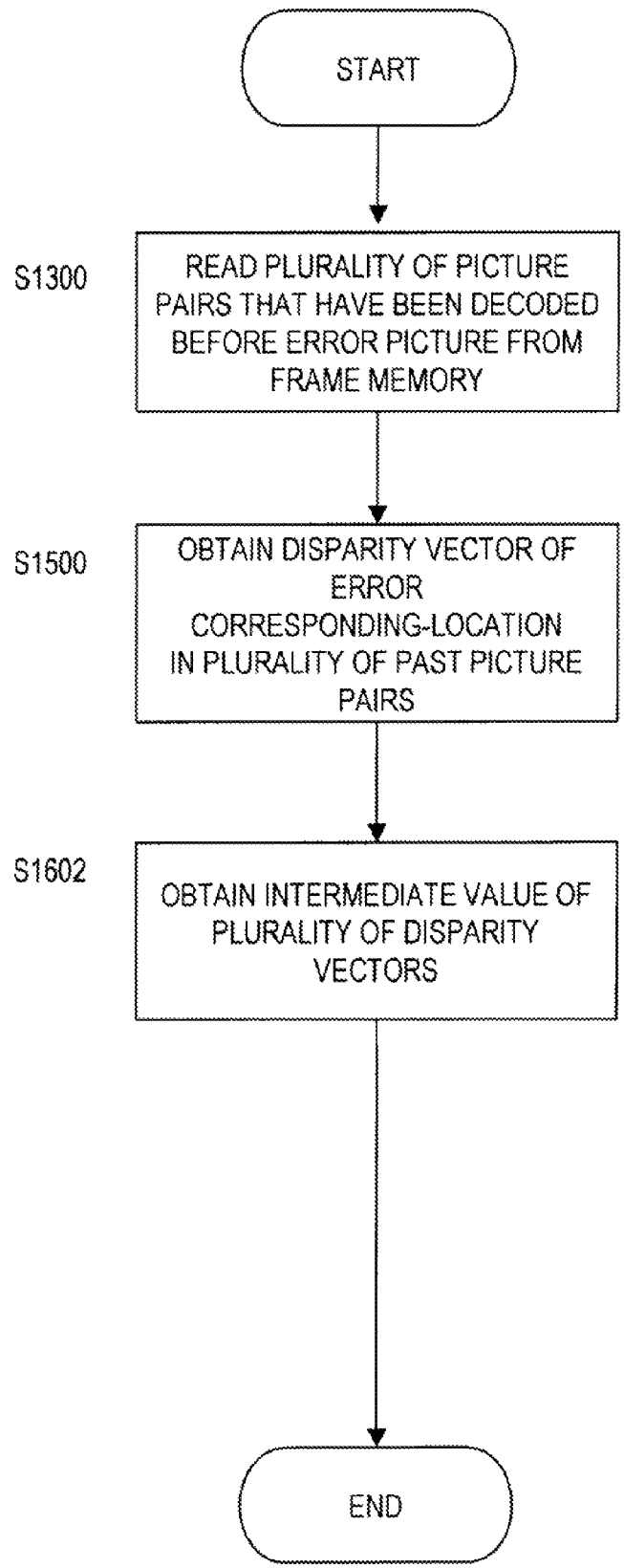
FIG. 16 is a flowchart illustrating the disparity estimation process in the second modified example.

FIG. 16 is a flowchart illustrating the disparity estimation process in the second modified example. The process of FIG. 16 is a result of substituting step S1502 in the process of FIG. 15 with step S1602. In step S1602, the disparity estimation unit 320 calculates the intermediate value of the disparity vectors obtained in the past picture pair.

As explained above, according to this embodiment, the decoding error can be corrected accurately in the stereoscopic dynamic image data.

The foregoing embodiments can be summarized as follows.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of the superiority and inferiority of the embodiments. Although the embodiments have been described in detail, it should be understood that the various changes, substitutions, and alterations could be made hereto without departing from the spirit and scope of the invention.

What is claimed is:

1. An image processing apparatus, comprising:
a decoding unit configured to decode encoded stereoscopic dynamic image data containing a plurality of picture pairs each having a disparity, for each block into which the picture is divided, and to detect an error block in which a decoding error is generated while decoding;
an estimation unit configured to perform a first estimation processing including
detecting, among pictures which are decoded prior to an error picture having the error block, an approximate picture having a block being approximate to a peripheral block in the error picture which is peripheral to the error block,
detecting a second block being approximate to a first block at a corresponding-location in the approximate picture which corresponds to a location of the error block in the error picture, in a paired picture of the approximate picture, and
estimating, as an estimated disparity of the error block, a disparity between the first block in the approximate picture and the second block in the paired picture of the approximate picture; and
a correction unit configured to generate a corrected image of the error block according to a decoded image of a third block located at a position shifted by an amount of the estimated disparity from a corresponding-location in a paired picture of the error picture which corresponds to the location of the error block in the error picture.

2. The image processing apparatus according to claim 1, wherein the approximate picture is a picture, among pictures which have been decoded before the error picture, for which a square error between blocks that are peripheral to the corresponding-location in the approximate picture and blocks that are peripheral to the error block in the error picture becomes minimum.

3. The image processing apparatus according to claim 1, wherein in the detecting the approximate picture, the approximate picture is detected among pictures which are the same viewpoint as the error picture.

4. The image processing apparatus according to claim 1, wherein the estimation unit obtains, as the estimated disparity, an average or intermediate disparity of the disparities of the corresponding-location in a plurality of pictures that have been decoded before the error picture.

5. The image processing apparatus according to claim 1, wherein the estimation unit performs the first estimation processing when the decoding unit decodes a predetermined block that is peripheral to the error block in the error picture, based on a first encoding method of referring to blocks in that error picture.

6. The image processing apparatus according to claim 5, wherein, when the decoding unit decodes the predetermined block that is peripheral to the error block based on a second encoding method of referring to blocks in another picture that is different from the error picture, the estimation unit performs second estimation processing of estimating, as the estimated disparity, a disparity of the corresponding-location in that other picture and a paired picture thereof.

7. The image processing apparatus according to claim 6, wherein the first encoding method is an encoding method based on intra prediction in an H.264 standard, and the second encoding method is an encoding method based on inter prediction in an H.264 standard.

8. An image processing method, comprising:
a decoding encoded stereoscopic dynamic image data containing a plurality of picture pairs each having a disparity, for each block into which the picture is divided, and to detect an error block in which a decoding error is generated while decoding;
a first estimation processing including
detecting, among pictures which are decoded prior to an error picture having the error block, an approximate picture having a block being approximate to a peripheral block in the error picture which is peripheral to the error block,
detecting a second block being approximate to a first block at a corresponding-location in the approximate picture which corresponds to a location of the error block in the error picture, in a paired picture of the approximate picture, and
estimating, as an estimated disparity of the error block, a disparity between the first block in the approximate picture and the second block in the paired picture of the approximate picture; and
generating a corrected image of the error block according to a decoded image of a third block located at a position shifted by an amount of the estimated disparity from a corresponding-location in a paired picture of the error picture which corresponds to the location of the error block in the error picture.

9. The image processing method according to claim 8, wherein the approximate picture is a picture, among pictures which have been decoded before the error picture, for which a square error between blocks that are peripheral to the corresponding-location in the approximate picture and blocks that are peripheral to the error block in the error picture becomes minimum.

10. The image processing method according to claim 8, wherein in the detecting the approximate picture, the approximate picture is detected among pictures which are the same viewpoint as the error picture.

11. The image processing method according to claim 8, wherein, in the estimating, an average or intermediate disparity of the disparities of the corresponding-location in a plurality of pictures that have been decoded before the error picture is obtained as the estimated disparity.

12. The image processing method according to claim 8, wherein, in the estimating, the first estimation processing is performed when a predetermined block that is peripheral to the error block in the error picture is decoded based on a first encoding method of referring to blocks in that error picture.

13. The image processing method according to claim 12, wherein, in the estimating, when the predetermined block that is peripheral to the error block is decoded based on a second encoding method of referring to blocks in another picture that is different from the error picture, second estimation processing of estimating, as the estimated disparity, a disparity of the corresponding-location in that other picture and a paired picture thereof is performed.

14. The image processing method according to claim 13, wherein the first encoding method is an encoding method based on intra prediction in an H.264 standard, and the second encoding method is an encoding method based on inter prediction in an H.264 standard.

* * * * *